United States Patent
Lee et al.

(10) Patent No.: US 10,216,043 B2
(45) Date of Patent: Feb. 26, 2019

(54) LIQUID CRYSTAL DISPLAY HAVING A SEALANT SEPARATED FROM AN ALIGNMENT LAYER

(71) Applicant: Samsung Display Co., Ltd, Yongin-si, Gyeonggi-do (KR)

(72) Inventors: Sang-Myoung Lee, Seoul (KR); Seung Jun Yu, Suwon-si (KR); Do Yeong Park, Seoul (KR); Young Goo Song, Asan-si (KR); Sang Woo Whangbo, Seoul (KR)

(73) Assignee: Samsung Display Co., Ltd. (KR)

( * ) Notice: Subject to any disclaimer, the term of this patent is extended or adjusted under 35 U.S.C. 154(b) by 45 days.

(21) Appl. No.: 15/351,147

(22) Filed: Nov. 14, 2016

(65) Prior Publication Data

US 2017/0059943 A1    Mar. 2, 2017

Related U.S. Application Data

(63) Continuation of application No. 14/265,813, filed on Apr. 30, 2014, now Pat. No. 9,494,828.

(30) Foreign Application Priority Data

Oct. 10, 2013    (KR) .................... 10-2013-0120693

(51) Int. Cl.
*G02F 1/1339*    (2006.01)
*G02F 1/1333*    (2006.01)
(Continued)

(52) U.S. Cl.
CPC ...... *G02F 1/133788* (2013.01); *G02F 1/1339* (2013.01); *G02F 1/13378* (2013.01);
(Continued)

(58) Field of Classification Search
CPC ............. G02F 1/1337; G02F 1/133753; G02F 1/133345; G02F 1/1345; G02F 1/13454; G02F 2001/133388
See application file for complete search history.

(56) References Cited

U.S. PATENT DOCUMENTS

| 6,099,786 A | 8/2000 | Hu |
| 8,094,269 B2 | 1/2012 | Kishioka |

(Continued)

FOREIGN PATENT DOCUMENTS

| CN | 1892309 A | 1/2007 |
| CN | 101233448 A | 7/2008 |

(Continued)

OTHER PUBLICATIONS

European Search Report corresponding to EP Application No. 14187708.4, dated Jan. 21, 2015, 13 pages.

*Primary Examiner* — Huyen Ngo
(74) *Attorney, Agent, or Firm* — Innovation Counsel LLP

(57) ABSTRACT

Embodiments relate to a liquid crystal display and a manufacturing method thereof, and more particularly, to a liquid crystal display including an alignment layer pattern and a manufacturing method thereof. The liquid crystal display includes a lower panel including a first alignment layer and a signal line. An upper panel faces the lower panel and uncovers an end portion of the signal line of the lower panel. A sealant is positioned between the lower panel and the upper panel and couples the lower panel and the upper panel with each other. The first alignment layer includes a first portion and a second portion that are separated from each other in a first direction, and the sealant is disposed between the first portion and the second portion and separated from the first portion and the second portion in the first direction.

21 Claims, 29 Drawing Sheets

(51) Int. Cl.
  *G02F 1/1362* (2006.01)
  *G02F 1/1337* (2006.01)
  *G02F 1/1335* (2006.01)
(52) U.S. Cl.
  CPC .. *G02F 1/133351* (2013.01); *G02F 1/133512* (2013.01); *G02F 1/133723* (2013.01); *G02F 2001/13398* (2013.01); *G02F 2001/133388* (2013.01); *G02F 2001/136295* (2013.01)

(56) References Cited

U.S. PATENT DOCUMENTS

| | | | |
|---|---|---|---|
| 8,223,309 B2 | 7/2012 | Shiau | |
| 8,421,970 B2 | 4/2013 | Chung | |
| 2007/0002260 A1 | 1/2007 | Choi | |
| 2008/0309839 A1* | 12/2008 | Kim | G02F 1/136286 349/44 |
| 2009/0021681 A1* | 1/2009 | Yun | G02F 1/1339 349/128 |
| 2010/0134745 A1* | 6/2010 | Lee | G02F 1/1341 349/153 |
| 2011/0176097 A1 | 7/2011 | Shiromoto | |
| 2013/0169913 A1* | 7/2013 | Choi | G02F 1/133512 349/110 |
| 2014/0132901 A1 | 5/2014 | Kim | |

FOREIGN PATENT DOCUMENTS

| | | |
|---|---|---|
| CN | 102455548 A | 5/2012 |
| JP | 2007-212666 A | 8/2007 |
| JP | 2009-258351 A | 11/2009 |
| KR | 1020040107937 A | 12/2004 |
| KR | 1020080001402 A | 1/2008 |
| KR | 1020090052590 A | 5/2009 |

* cited by examiner

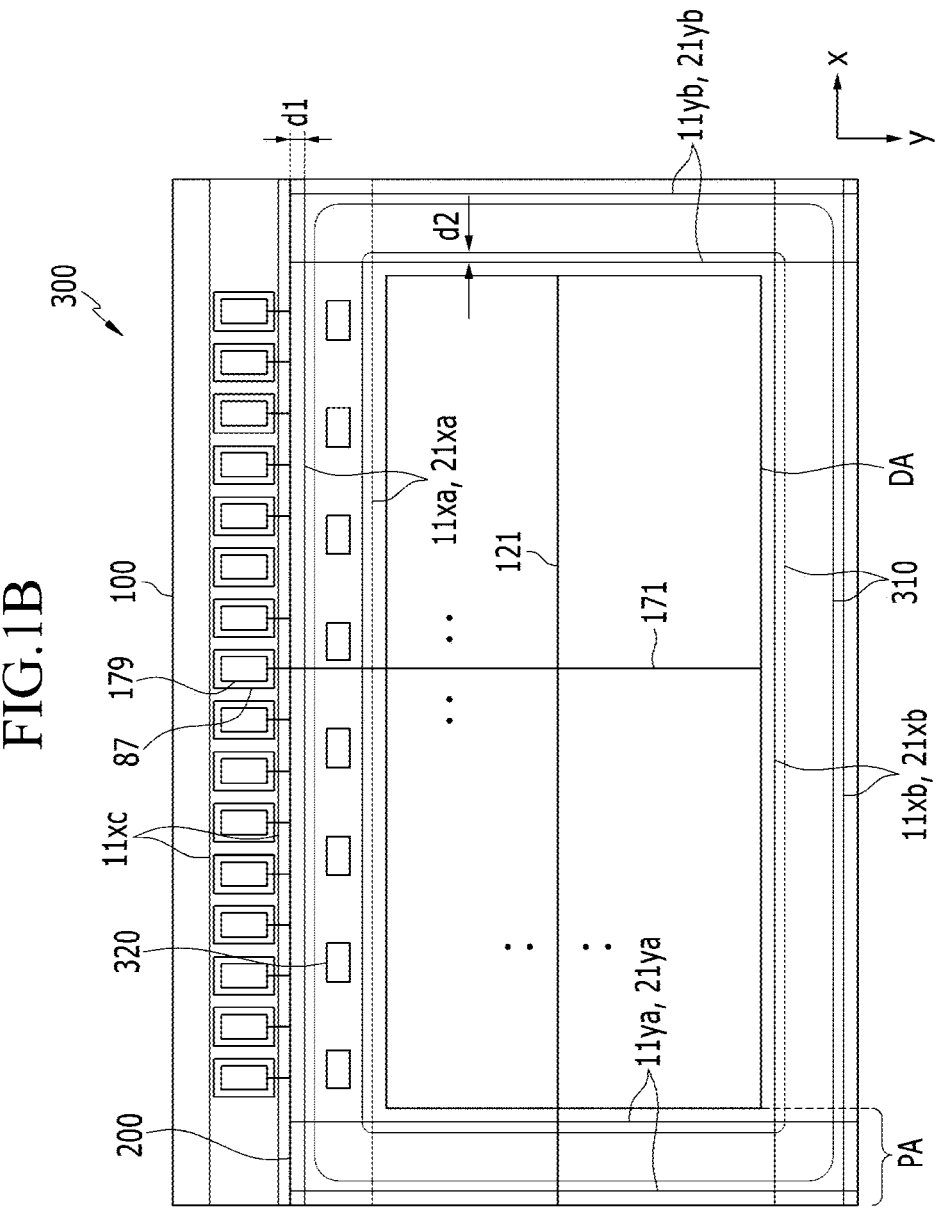

LIQUID CRYSTAL DISPLAY HAVING A
SEALANT SEPARATED FROM AN
ALIGNMENT LAYER

CROSS-REFERENCE TO RELATED
APPLICATION

This application is a continuation application of U.S. patent application Ser. No. 14/265,813 filed on Apr. 30, 2014, which claims priority to Korean Patent Application No. 10-2013-0120693 filed in the Korean Intellectual Property Office on Oct. 10, 2013, and all the benefits accruing therefrom under 35 U.S.C. § 119, the contents of the prior applications being herein incorporated by reference

BACKGROUND (a) Technical Field

The present application relates to a liquid crystal display and a manufacturing method thereof, and more particularly, to a liquid crystal display including an alignment layer pattern and a manufacturing method thereof.

(b) Description of the Related Art

A flat panel display means a display device having a smaller thickness smaller than a size of a screen, and a widely used flat panel display includes a liquid crystal display, an organic light emitting display, an electrophoretic display, an electrowetting display, and the like.

As one example of the display devices, the liquid crystal display, which is one of the most common types of flat panel displays currently in use, includes two sheets of display panels with electric field generating electrodes such as a pixel electrode and a common electrode and an alignment film, a liquid crystal layer interposed between the two display panels, and a plurality of color filters for displaying colors. The alignment layer determines initial alignment of liquid crystal molecules, and the electric field generating electrodes generates an electric field to change the alignment of the liquid crystal molecules of the liquid crystal layer. In such a liquid crystal display, polarization of incident light passing through the liquid crystal layer varies according to the alignment of the liquid crystal molecules, and a change in the polarization is represented as a change in transmittance of light by a polarizer.

When simply describing an example of a manufacturing method of the liquid crystal display, a plurality of signal lines, a plurality of switching elements, a plurality of pixel electrodes, and the like are formed on a lower mother substrate, and a separate upper mother substrate is provided. Next, alignment layers are coated on the lower mother substrate and the upper mother substrate. Thereafter, polymer chains of the alignment layer may be aligned in a predetermined direction by rubbing the cured alignment layer. Next, a short point and a sealant are formed on the lower mother substrate or the upper mother substrate, and a liquid crystal is dropped on the lower mother substrate or the upper mother substrate by using an inkjet method and the like. Next, the lower mother substrate and the upper mother substrate are bonded to each other and then cut by a cell unit to manufacture the liquid crystal display. Unlike this, each of the lower mother substrate and the upper mother substrate are cut by a cell unit to form a plurality of lower panels and upper panels, and then each lower panel and each upper panel may be bonded to each other.

The alignment layer determines an initial alignment state of the liquid crystal molecules in the completed liquid crystal display. A method of coating the alignment layer includes inkjet printing, spin coating, and the like. For example, when the alignment layer is coated on a display area of a cell by the inkjet method, a spreading degree of an edge of the coated alignment layer may not be uniform. Then, the alignment layer may be coated so as not to contact the sealant and reach the edge of the display area displaying an image. When the alignment layer is not coated up to the edge of the display area, the alignment of the liquid crystal molecules is not controlled and thus a display defect may be generated.

In order to prevent the various problems, when a margin of the coated area of the alignment layer is large, a distance between the display area and the sealant is increased, and thus a width of the edge except for the display area of the liquid crystal display may be increased.

The above information disclosed in this Background section is only for enhancement of understanding of the background of the disclosure and therefore it may contain information that does not form the prior art that is already known in this country to a person of ordinary skill in the art.

SUMMARY

Embodiments have been made in an effort to provide a liquid crystal display and a manufacturing method thereof having advantages of enhancing uniformity of an alignment layer and preventing a contact between a sealant and an alignment layer.

Embodiments have been made in an effort to provide a liquid crystal display and a manufacturing method thereof having advantages of reducing a manufacturing time of the liquid crystal display by reducing a patterning process time of an alignment layer after coating the alignment layer.

An exemplary embodiment provides a liquid crystal display, including: a lower panel including a first alignment layer and a signal line, and an upper panel facing the lower panel and uncovering an end portion of the signal line of the lower panel. A sealant is positioned between the lower panel and the upper panel and couples the lower panel and the upper panel with each other. The first alignment layer includes a coated region positioned between a first removed region overlapping the end portion of the signal line and a second removed region overlapping the sealant. The first alignment layer does not exist in the first removed region and the second removed region.

The upper panel may include a second alignment layer. The second alignment layer may include a third removed region overlapping the sealant, the second alignment layer not existing in the third removed region. The third removed region may be spaced apart from the first removed region.

At least one of the first removed region, the second removed region, and the third removed region may include a first straight portion and a second straight portion which extend substantially perpendicular to each other and cross each other. The first straight portion and the second straight portion may cross each other having any one shape of "┼", "┤", "┐", or a rotated form thereof in a cross region of the first straight portion and the second straight portion.

The second alignment layer may include a coated region positioned between the third removed region and an edge of the upper panel adjacent to the third removed region.

A coated region of the first alignment layer may be positioned between the first removed region and an edge of the lower panel adjacent to the first removed region.

The first removed region may continuously extend in a straight form from a first edge of the lower panel to a second edge facing the first edge.

The third removed region may continuously extend in a straight form from a third edge of the upper panel to a fourth edge facing the third edge.

The second removed region may substantially perpendicularly cross the first removed region.

The second removed region may continuously extend in a straight form from the first edge of the lower panel to the second edge.

A width of at least one of the first straight portion and the second straight portion may be uniform.

Widths of at least two of the first removed region, the second removed region, and the third removed region may be substantially the same as each other.

A coated region of the first alignment layer and a coated region of the second alignment layer may not overlap the sealant and are spaced apart from the sealant at a distance of 0 or more.

The liquid crystal display may further include a short point overlapping the sealant and electrically connecting the lower panel and the upper panel, in which the short point may overlap the second removed region and the third removed region.

The liquid crystal display may further include a plurality of signal lines. The first removed region may include a plurality of removed portions respectively overlapping end portions of the plurality of signal lines and separated from each other. A coated region of the first alignment layer may be positioned between adjacent removed portions overlapping the end portions of the plurality of signal lines.

The upper panel may include a second alignment layer, the second alignment layer may include a third removed region overlapping the sealant, the second alignment layer not existing in the third removed region, and the third removed region may be spaced apart from the first removed region.

At least one of the second removed region and the third removed region may include a first straight portion and a second straight portion which extend substantially perpendicular to each other and cross each other, and the first straight portion and the second straight portion may cross each other having any one shape of "＋", "┤", "┐", or a rotated form thereof in a cross region of the first straight portion and the second straight portion.

The third removed region may continuously extend in a straight form from a third edge of the upper panel to a fourth edge facing the third edge.

The second removed region may continuously extend in a straight form from a first edge of the lower panel to a second edge facing the first edge.

Another exemplary embodiment provides a manufacturing method of a liquid crystal display, including forming a plurality of signal lines including end portions on a lower mother substrate. A first alignment layer is coated on the lower mother substrate. A first removed region and a second removed region are formed by patterning the first alignment layer using a laser beam. The first removed region overlaps the end portion of the signal line and the second removed region is adjacent to the first removed region and extends in parallel to and spaced apart from the first removed region. A sealant is formed overlapping the second removed region on the lower mother substrate.

The manufacturing method of a liquid crystal display may further include coating a second alignment layer on an upper mother substrate. A third removed region overlapping the sealant and spaced apart from the first removed region is formed by patterning the second alignment layer using the laser beam.

At least one of the first removed region, the second removed region, and the third removed region may include a first straight portion and a second straight portion which extend substantially perpendicular to each other and cross each other. The first straight portion and the second straight portion may cross each other having any one shape of "＋", "┤", "┐", or a rotated form thereof in a cross region of the first straight portion and the second straight portion.

The laser beam may include a first laser beam irradiating unit and a second laser beam irradiating unit which move in an orthogonal direction to each other irradiating the laser beam.

The laser beam may be irradiated while moving continuously in a straight line from a first edge of the lower mother substrate or the upper mother substrate to a second edge of the lower mother substrate or the upper mother substrate facing the first edge.

Irradiating of the laser beam may be stopped intermittently during a time of moving in a straight line from the first edge of the lower mother substrate or the upper mother substrate to the second edge.

Widths of at least two of the first removed region, the second removed region, and the third removed region may be substantially the same as each other.

The manufacturing method of a liquid crystal display may further include forming a plurality of lower panels and a plurality of upper panels by cutting each of the lower mother substrate and the upper mother substrate by a cell unit; and bonding the lower panel and the upper panel to each other.

According to the exemplary embodiments, it is possible to enhance uniformity of an alignment layer in the liquid crystal display and prevent a contact between a sealant and an alignment layer. Further, it is possible to reduce a manufacturing time of the liquid crystal display by reducing a patterning process time of an alignment layer after coating the alignment layer in the manufacturing process of the liquid crystal display.

BRIEF DESCRIPTION OF THE DRAWINGS

FIGS. 1A and 1B are layout views of a liquid crystal display according to an exemplary embodiment, respectively.

DETAILED DESCRIPTION OF THE EMBODIMENTS

Figure 1A:
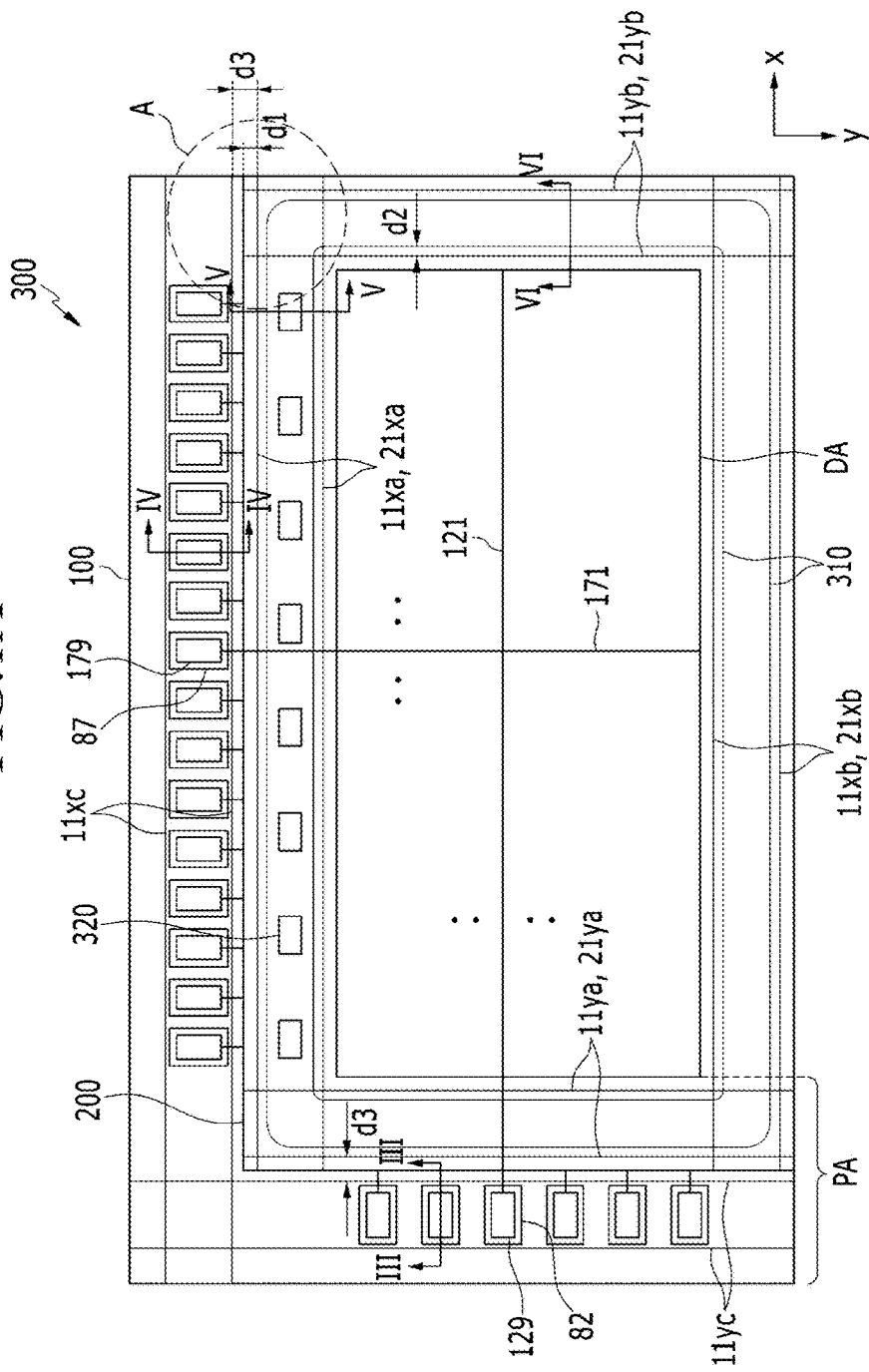

Embodiments will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display according to an exemplary embodiment will be described in detail with reference to FIGS. 1A to 6.

Figure 1C:
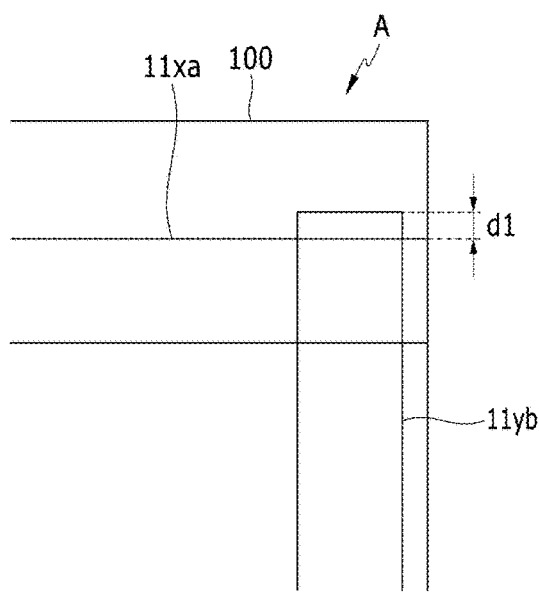
FIG. 1C is an enlarged view of a part of FIG. 1A.
Figure 2:
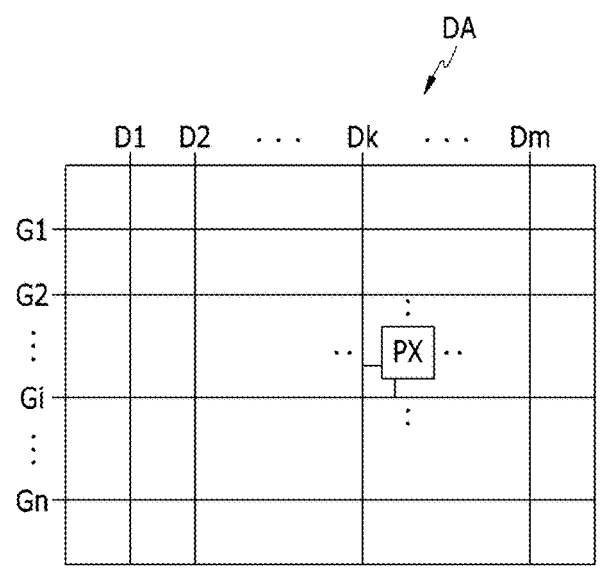
FIG. 2 is a layout view of a display area of the liquid crystal display according to the exemplary embodiment.
Figure 3:
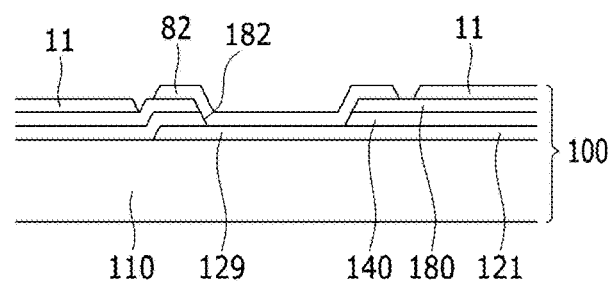
FIG. 3 is an example of a cross-sectional view illustrating the liquid crystal display of FIG. 1A taken along line III-III.
Figure 4:
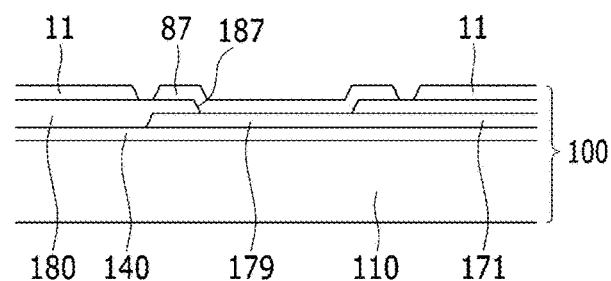
FIG. 4 is an example of a cross-sectional view illustrating the liquid crystal display of FIG. 1A taken along line IV-IV.
Figure 5:
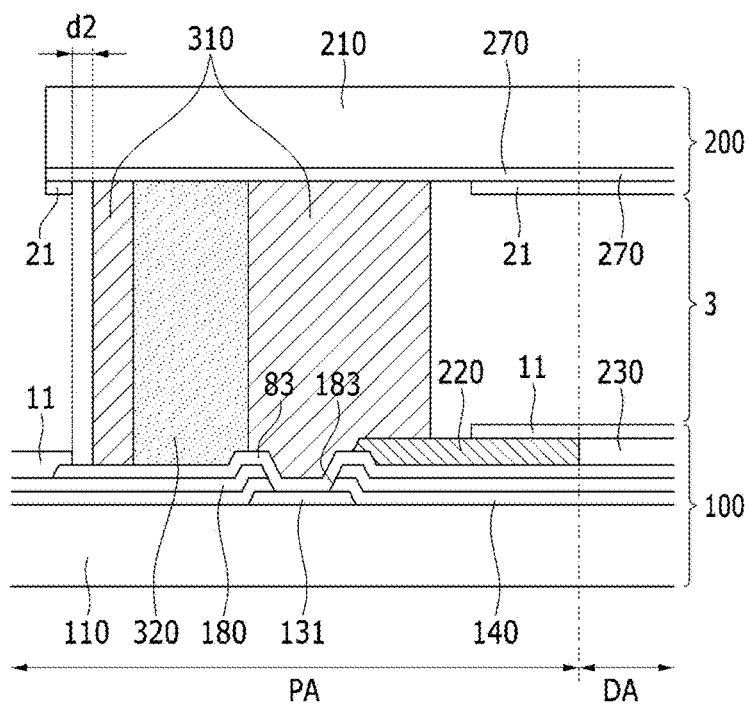
FIG. 5 is an example of a cross-sectional view illustrating the liquid crystal display of FIG. 1A taken along line V-V.
Figure 6:
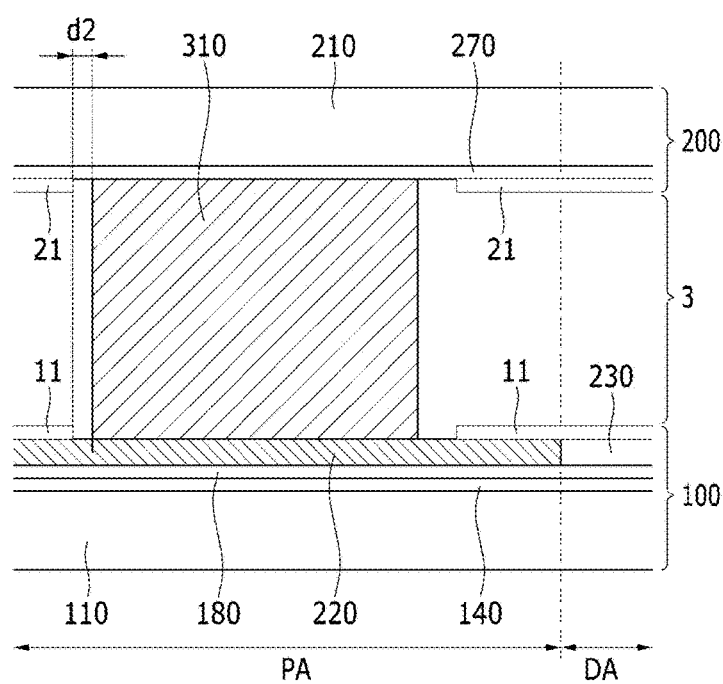
FIG. 6 is an example of a cross-sectional view illustrating the liquid crystal display of FIG. 1A taken along line VI-VI.

FIGS. 1A and 1B are layout views of a liquid crystal display according to an exemplary embodiment, respectively. FIG. 1C is an enlarged diagram of a part of FIG. 1A. FIG. 2 is a layout view of a display area of the liquid crystal display according to the exemplary embodiment. FIG. 3 is an example of a cross-sectional view illustrating the liquid crystal display of FIG. 1A taken along line III-III. FIG. 4 is an example of a cross-sectional view illustrating the liquid crystal display of FIG. 1A taken along line IV-IV. FIG. 5 is an example of a cross-sectional view illustrating the liquid crystal display of FIG. 1A taken along line V-V. FIG. 6 is an example of a cross-sectional view illustrating the liquid crystal display of FIG. 1A taken along line VI-VI.

Referring to FIGS. 1A, 1B, a display panel 300 of a liquid crystal display according to an exemplary embodiment includes a display area DA which is an area displaying an image, and a peripheral area PA disposed around the display area DA, when viewed from a plane structure. When viewed from a cross-sectional structure illustrated in FIGS. 3 to 6, the display panel 300 according to the exemplary embodiment includes a lower panel 100 and an upper panel 200 facing each other, and a liquid crystal layer 3 interposed therebetween.

Referring to FIGS. 1A, 1B, and 2, signal lines D1-Dm, G1-Gn, 121, and 171, and pixels PX connected to the signal lines and arranged substantially in a matrix form are included in the display area DA.

The signal lines include gate lines G1-Gn and 121 provided on the lower panel 100 and transferring gate signals (referred to as "scanning signals"), and data lines D1-Dm and 171 transferring data voltages. The gate lines G1-Gn extend substantially in a row direction and are almost parallel to each other, and the data lines D1-Dm extend substantially in a column direction and are almost parallel to each other. In the drawing, the row direction is illustrated as an x direction, and a column direction is illustrated as a y direction which is substantially perpendicular to the x direction.

Each pixel PX may include a switching element (not illustrated) connected to at least one gate line G1-Gn and at least one data line D1-Dm, and at least one pixel electrode (not illustrated) connected with the switching element. Referring to FIG. 5 or 6 together, each pixel PX may further include an opposed electrode 270 generating an electric field together with the pixel electrode, and a liquid crystal layer 3 positioned between the pixel electrode and the opposed electrode 270. The switching element may include at least one thin film transistor. The opposed electrode 270 may transfer a common voltage, and be positioned on the lower panel 100 or the upper panel 200. In the exemplary embodiment illustrated in FIGS. 1A to 6, the opposed electrode 270 is positioned on the upper panel 200, but is not limited thereto, and the opposed electrode 270 may be positioned on the lower panel 100.

In order to implement color display, each pixel PX uniquely displays one of primary colors (spatial division) or alternately displays the primary colors with time (temporal division) so that a desired color is recognized by the spatial and temporal sum of the primary colors. An example of the primary colors may include three primary colors such as red, green, blue, or four primary colors. Each pixel PX may further include a color filter positioned at a place corresponding to each pixel electrode and expressing one of the primary colors.

Referring to FIG. 1A, in the peripheral area PA, end portions 129 of the gate lines G1-Gn and 121, end portions 179 of the data lines D1-Dm and 171, a sealant 310, and a short point 320 may be positioned.

Regions where the end portions 129 of the gate lines G1-Gn and 121 and the end portions 179 of the data lines D1-Dm and 171 are positioned in the peripheral area PA of the lower panel 100 are not covered, i.e., uncovered, by the upper panel 200, and exposed.

The end portions 129 of the gate lines G1-Gn and 121 may be positioned at a part of the peripheral area PA of the lower panel 100, for example, a left edge region. The end portions 129 of the plurality of gate lines G1-Gn and 121 may be arranged substantially in a y direction. For connection with another layer or a gate driver (not illustrated), the end portions 129 of the gate lines may be wider than other portions of the gate lines G1-Gn and 121.

Referring to FIG. 3, the gate line 121 including the end portion 129 is positioned on a lower substrate 110 of the lower panel 100 made of transparent glass, plastic, or the like. The gate line 121 may include a conductive material such as metal. A gate insulating layer 140 made of silicon nitride (SiNx), silicon oxide (SiOx), or the like is positioned on the gate line 121. A passivation layer 180 including an insulating material is positioned on the gate insulating layer 140. Meanwhile, in the display area DA, a thin film transistor (not illustrated) may be positioned between the gate insulating layer 140 and the passivation layer 180. The gate insulating layer 140 and the passivation layer 180 include a contact hole 182 extending to and exposing the end portion 129 of the gate line 121. A contact assistant 82 is disposed on the end portion 129 of the gate line 121 exposed by the contact hole 182. The contact assistant 82 may be extended onto the passivation layer 180 from the end portion 129 of the gate line 121. The contact assistant 82 is electrically and physically connected to the end portion 129 of the gate line 121, and may include a conductive material such as ITO and IZO.

Referring back to FIG. 1A, the end portions 179 of the data lines D1-Dm and 171 may be positioned at a part of the peripheral area PA of the lower panel 100, for example, an upper edge region. The end portions 179 of the plurality of data lines D1-Dm and 171 may be arranged substantially in an x direction. For connection with another layer or a data driver (not illustrated), the end portions 179 of the data lines D1-Dm and 171 may be wider than other portions of the data lines D1-Dm and 171.

Referring to FIG. 4, the data line 171 including the end portion 179 is positioned on the gate insulating layer 140 of the lower panel 100. The data line 171 may include a conductive material such as metal. The passivation layer 180 is positioned on the data line 171, and the passivation layer 180 includes a contact hole 187 extending to and exposing the end portion 179 of the data line 171. A contact assistant 87 positioned on the passivation layer 180 may be electrically and physically connected to the end portion 179 of the data line 171 through the contact hole 187. The contact assistant 87 may include a conductive material such as ITO and IZO.

The gate driver (not illustrated) and the data driver (not illustrated) may be directly mounted on the lower panel 100 in an IC chip form to be connected with the contact assistants 82 and 87, respectively, or mounted on a flexible printed circuit film (not illustrated) to be attached to the lower panel 100 in a tape carrier package (TCP) form and be connected with the contact assistants 82 and 87.

Unlike this, either gate driver or the data driver may also be integrated on the display panel 300 together with the signal lines G1-Gn and D1-Dm, the thin film transistor, and the like. For example, the gate driver is not provided in a chip form, but may be integrated on the lower panel 100. In this case, the gate line 121 may be directly connected to a circuit of the gate driver integrated on the lower panel 100, and as illustrated in FIG. 1B, the end portion 129 of the gate line 121 may be omitted.

According to another exemplary embodiment, the gate driver or the data driver may also be positioned at both sides of the lower panel 100 based on the display area DA. In this case, the end portion 129 of the gate line 121 illustrated in FIG. 1A may also be positioned at a right end of the gate line 121, and the end portion 179 of the data line 171 may also be positioned below the data line 171.

Referring back to FIG. 1A or 1B, the sealant 310 is formed around the display area DA of the lower panel 100 and the upper panel 200 to form a closed curve. Referring to FIG. 6, the sealant 310 couples and fixes the lower panel 100 and the upper panel 200 and seals the liquid crystal layer 3 between the display panels 100 and 200. The sealant 310 may be transparent or opaque. The opaque sealant may include a pigment such as black carbon.

Referring to FIGS. 1A, 1B, and 5, the short point 320 is disposed between the panels 100 and 200 in the peripheral area PA to be connected to a conductor of the lower panel 100 and a conductor of the upper panel 200. For example, the short point 320 may transfer an electric signal such as a common voltage from the lower panel 100 to the upper panel 200 or from the upper panel 200 to the lower panel 100.

In more detail, referring to FIG. 5, the lower panel 100 may further include a common voltage transfer line 131 positioned on the lower substrate 110. The gate insulating layer 140 and the passivation layer 180 may be positioned on or below the common voltage transfer line 131. FIG. 5 illustrates an example in which the gate insulating layer 140 and the passivation layer 180 are sequentially laminated on the common voltage transfer line 131. In this case, the gate insulating layer 140 and the passivation layer 180 may include a contact hole 183 extending to and exposing the common voltage transfer line 131. A contact assistant 83 is positioned on the passivation layer 180, and the contact assistant 83 may be electrically and physically connected with the common voltage transfer line 131 through the contact hole 183. The upper panel 200 may further include the opposed electrode 270 positioned on an upper substrate 210. The short point 320 may transfer a common voltage Vcom transferred by the common voltage transfer line 131 to the opposed electrode 270 of the upper panel 200 by electrically connecting the contact assistant 83 of the lower panel 100 and the opposed electrode 270 of the upper panel 200.

The short point 320 may be a conductive column type spacer which may maintain a gap between the lower panel 100 and the upper panel 200, and may be formed by a conductive ball having conductivity. The conductive ball may be included in the sealant 310.

The short point 320 may be positioned at a place overlapping a region with the sealant 310 as illustrated in FIGS. 1A, 1B, and 5, but is not limited thereto.

However, the short point 320 may be omitted according to a structure of the display panel 300.

Meanwhile, the lower panel 100 or the upper panel 200 may further include a light blocking member 220 and a color filter 230. In the exemplary embodiment illustrated in FIGS. 1A to 6, the color filter 230 and the light blocking member 220 are positioned on the lower panel 100. In more detail, the color filter 230 and the light blocking member 220 may be positioned on the passivation layer 180. In this case, an overcoat (not illustrated) preventing the color filter 230 and the light blocking member 220 from being exposed may be positioned above the color filter 230 and the light blocking member 220. The overcoat may be formed by an inorganic insulating layer or an organic insulating layer.

The color filter 230 is mainly positioned in the display area DA, and may uniquely display one of the primary colors. An example of the primary colors may include three primary colors such as red, green, and blue, three primary colors such as yellow, cyan, and magenta, four primary colors, or the like. According to another exemplary embodiment, the color filter 230 may further include a color filter displaying a mixed color of the primary colors or white in addition to the primary colors. Each color filter 230 may be formed to elongate along a pixel column or a pixel row.

The light blocking members 220 may be positioned in the display area DA and the peripheral area PA. The light blocking member 220 may include a pigment such as black carbon, and include a photosensitive organic material.

The light blocking member 220 positioned in the display area DA is called a black matrix and may prevent light leakage between the pixels. The light blocking member 220 of the display area DA may generally include a portion positioned between the adjacent color filters 230.

According to another exemplary embodiment, the light blocking member 220 may also be positioned on the passivation layer 180, and in this case, the light blocking member 220 may further include a colored spacer which maintains a gap between the lower panel 100 and the upper panel 200.

Referring to FIGS. 1A to 6, according to the exemplary embodiment, alignment layers 11 and 21 are positioned on inner surfaces of the lower panel 100 and the upper panel 200, and the alignment layers 11 and 21 are patterned and thus a partial region is removed. The alignment layers 11 and 21 may be horizontal or vertical alignment layers, and rubbed in a predetermined direction. Unlike this, the alignment layers 11 and 21 include photoreactive materials to be photo-aligned.

The alignment layers 11 and 21 may include an alignment layer material such as polyimide (PI). The alignment layers 11 and 21 may be formed by coating, drying, and then patterning an aligning agent including an alignment layer material and a solvent on the lower substrate 110 and the upper substrate 210 or the entire surface of the mother substrates thereof by a method such as inkjet printing or spin coating. The patterning of the alignment layers 11 and 21 uses a laser beam.

The alignment layer 11 of the lower panel 100 includes a plurality of removed regions 11xa, 11xb, 11xc, 11ya, 11yb, and 11yc which are patterned and removed regions, and all regions other than the removed regions 11xa, 11xb, 11xc, 11ya, 11yb, and 11yc form a coated region of the alignment layer 11.

The removed region 11xa and the removed region 11xb are parallel to each other and extend substantially in an x direction. The removed region 11ya and the removed region 11yb are parallel to each other and extend substantially in a y direction. The respective removed regions 11xa, 11xb, 11ya, and 11yb extend substantially in a straight form. The removed regions 11xa and 11xb extending in the x direction and the removed regions 11ya and 11yb extending in the y direction cross each other, and the removed regions 11xa, 11xb, 11ya, and 11yb crossing each other are connected to each other. Four removed regions 11xa, 11xb, 11ya, and 11yb form a closed curve surrounding the display area DA together.

Two removed regions 11xa, 11xb, 11ya, and 11yb which extend in different directions to meet each other cross each other to have a shape of "+" or "+", or a rotated form thereof in at least one cross region, as illustrated in FIGS. 1A and 1B. In this case, referring to FIGS. 1A and 1C, a length d1 of a portion protruding by passing through an opposing side in the cross region of the two removed regions 11xa, 11xb, 11ya, and 11yb crossing each other is larger than 0.

In the cross region of the removed region 11xb and the removed regions 11ya and 11yb crossing the removed region 11xb, when the removed regions 11ya and 11yb include the protrusion, the coated region of the alignment layer 11 may exist between the removed region 11xb and the edge of the lower panel 100 adjacent to the removed region 11xb. Similarly, when in the cross region of the removed region 11yb and the removed regions 11xa and 11xb crossing the removed region 11yb, the removed regions 11xa and 11xb include the protrusion, the coated region of the alignment layer 11 may exist between the removed region 11yb and the edge of the lower panel 100 adjacent to the removed region 11yb.

However, unlike this, the two removed regions 11xa, 11xb, 11ya, and 11yb crossing each other may have a shape of "⌐" or a rotated form thereof in at least one cross region. In this case, the length d1 of the protrusion may be substantially 0.

The removed regions 11xa, 11xb, 11ya, and 11yb overlap a region where the sealant 310 is positioned. In more detail, the sealant 310 is positioned within an edge boundary of the four removed regions 11xa, 11xb, 11ya, and 11yb forming the closed curve, and a distance d2 between the sealant 310 and the edge of the removed regions 11xa, 11xb, 11ya, and 11yb may be larger than or equal to 0. FIGS. 1A, 1B, 5, and 6 illustrate an example in which the distance d2 between the sealant 310 and the edges of the removed regions 11xa, 11xb, 11ya, and 11yb is larger than 0.

As such, according to the exemplary embodiment, since the sealant 310 and the coated region of the alignment layer 11 do not overlap each other, it is possible to prevent defects which may be generated by overlapping of the coated region of the alignment layer 11 and the sealant 310, for example, an adhesion defect of the sealant 310, deterioration of reliability of the display panel 300 due to moisture penetration to the inner region surrounded by the sealant 310, a resistance increase of the short point 320, and the like.

The removed region 11xc is adjacent to the removed region 11xa, positioned outside the removed region 11xa, and extends to be parallel to the removed region 11xa. The removed region 11yc is adjacent to the removed region 11ya, positioned outside the removed region 11ya, and extends to be substantially parallel to the removed region 11ya. Each of the removed regions 11xc and 11yc extends substantially in a straight form. The two removed regions 11xc and 11yc cross each other and are connected to each other.

The two removed regions 11xc and 11yc cross each other, and may have a shape of "+" or "+", or a rotated form thereof in the cross region, as illustrated in FIG. 1A. In this case, the coated region of the alignment layer 11 may exist between the removed regions 11xc and 11yc and at least two edges of the lower panel 100 adjacent thereto.

However, unlike this, the two removed regions 11xc and 11yc may have a shape of "⌐" or a rotated form thereof in the cross region.

The removed region 11xc overlaps a region where the contact assistant 87 connected to the end portion 179 of the data line 171 is positioned, and the removed region 11yc overlaps a region where the contact assistant 82 connected to the end portion 129 of the gate line 121 is positioned. That is, the contact assistants 82 and 87 include portions which are not covered by the coated region of the alignment layer 11 but exposed. The exemplary embodiment illustrated in FIGS. 1A, 3, and 4 illustrates an example in which the respective contact assistants 82 and 87 are positioned within the edge boundaries of all the removed regions 11xc and 11yc and are not covered by the coated region of the alignment layer 11. Further, the removed regions 11xc and 11yc are not covered, i.e., are uncovered, by the upper panel 200 and exposed. The contact assistants 82 and 87 are electrically connected with the gate driver or the data driver through the removed regions 11xc and 11yc of the alignment layer 11 to receive signals.

When the gate driver or the data driver is positioned at both sides of the lower panel 100 based on the display area DA, the end portion 129 of the gate line 121 or the end portion 179 of the data line 171 may be opposite to each other at both sides of the lower panel 100. In this case, although not illustrated, the removed regions 11xc and 11yc of the alignment layer 11 may be positioned at both sides of the lower panel 100 based on the display area DA, respectively.

According to the exemplary embodiment, a distance d3 between two removed regions 11ya and 11yc which are adjacent to each other and extend to be parallel to each other or between the removed regions 11xa and 11xc is larger than 0.

That is, the two removed regions 11ya and 11yc or the two removed regions 11xa and 11xc are formed through respective laser beam irradiating processes to be spaced apart from each other. As such, the removed regions 11xc and 11yc overlapping the contact assistants 82 and 87 which are pad regions of the signal line, and the removed regions 11xa and 11ya overlapping the sealant 310 are formed through respective laser beam irradiating processes. As a result, it is possible to decrease a region where the laser beam is irradiated and reduce a manufacturing time of the liquid crystal display by patterning the alignment layer 11 with small energy within a short time.

When the two removed regions 11xa, 11xb, 11ya, and 11yb crossing each other include at least one protrusion in the cross region, the length d1 of the protrusion of the removed regions 11xa, 11xb, 11ya, and 11yb may be smaller than the distance d3 between the two removed regions 11ya and 11yc or between the two removed regions 11xa and 11xc, as illustrated in FIG. 1A. In this case, the removed regions 11xa, 11xb, 11ya, and 11yb may not meet the removed regions 11xc and 11yc. However, embodiments are not limited thereto, and the length d1 of the protrusion of the removed regions 11xa, 11xb, 11ya, and 11yb may be larger than or equal to the distance d3 between the two removed regions 11ya and 11yc or between the two removed regions 11xa and 11xc.

The alignment layer 21 of the upper panel 200 includes a plurality of removed regions 21xa, 21xb, 21ya, and 21yb which are patterned and removed regions. The removed regions 21xa, 21xb, 21ya, and 21yb may have the same shape and the same size as the removed regions 11xa, 11xb, 11ya, and 11yb of the alignment layer 11 facing the removed regions 21xa, 21xb, 21ya, and 21yb. Accordingly, the removed regions 21xa, 21xb, 21ya, and 21yb overlap the region where the sealant 310 is positioned, and a distance d2 between the sealant 310 and an edge of the removed regions 21xa, 21xb, 21ya, and 21yb may be larger than or equal to 0. FIGS. 1A, 1B, 5, and 6 illustrate an example in which the distance d2 between the sealant 310 and the edge of the removed regions 21xa, 21xb, 21ya, and 21yb is larger than 0. In addition, since the description for the removed regions 21xa, 21xb, 21ya, and 21yb of the alignment layer 21 is the same as the description for the removed regions 11xa, 11xb, 11ya, and 11yb of the alignment layer 11 described above, the detailed description is omitted.

As such, according to the exemplary embodiment, since the sealant 310 and the coated region of the alignment layer 21 do not overlap each other, it is possible to prevent defects which may be generated by overlapping of the coated region of the alignment layer 21 and the sealant 310, for example, an adhesion defect of the sealant 310, deterioration of reliability of the display panel 300 due to moisture penetration to the inner region surrounded by the sealant 310, a resistance increase of the short point 320, and the like.

According to the exemplary embodiment, widths of the respective removed regions 11xa, 11xb, 11xc, 11ya, 11yb, and 11yc of the alignment layer 11 are uniform. Further, widths of the removed regions 11xa, 11xb, 11ya, and 11yb overlapping the sealant 310 may be the same as or different from each other. Similarly, widths of removed regions 21xa, 21xb, 21ya, and 21yb overlapping the sealant 310 may be the same as or different from each other. Further, the widths of the removed regions 11xc and 11yc of the alignment layer 11 of the lower panel 100 may be the same as or different from the widths of the removed regions 11xa, 11xb, 11ya, and 11yb. Widths of the two removed regions 11xc and 11yc may be the same as or different from each other. The widths of the removed regions 11xa, 11xb, 11xc, 11ya, 11yb, and 11yc and the removed regions 21xa, 21xb, 21ya, and 21yb may be determined by controlling a size of the laser beam.

Since the laser beam is irradiated twice at the cross region between the removed regions 11xa, 11xb, 11ya, and 11yb, the cross region between the removed regions 21xa, 21xb, 21ya, and 21yb, and the cross region between the removed regions 11xc and 11yc, a part of the layer positioned below the alignment layers 11 and 21 may be removed.

The liquid crystal layer 3 includes liquid crystal molecules (not illustrated) having dielectric anisotropy. The liquid crystal molecules may be aligned so that long axes thereof are parallel to the display panels 100 and 200 without applying the electric field to the liquid crystal layer 3, and in this case, the liquid crystal molecules may have positive dielectric anisotropy. The liquid crystal molecules 31 may be nematic liquid crystal molecules having a structure in which long-axial directions thereof are spirally twisted from the lower panel 100 to the upper panel 200. According to another exemplary embodiment, the liquid crystal molecules may be aligned so that long axes thereof are generally vertical to the display panels 100 and 200 without applying the electric field to the liquid crystal layer 3, and in this case, the liquid crystal molecules may have negative dielectric anisotropy.

Next, an example of a structure of a pixel PX positioned in a display area DA of a liquid crystal display according to an exemplary embodiment will be described with reference to FIGS. 7 and 8. Like reference numerals designate the same constituent elements as the exemplary embodiment described above, and the same description is omitted, but differences will be mainly described, which hereinafter, is the same.

Figure 7:
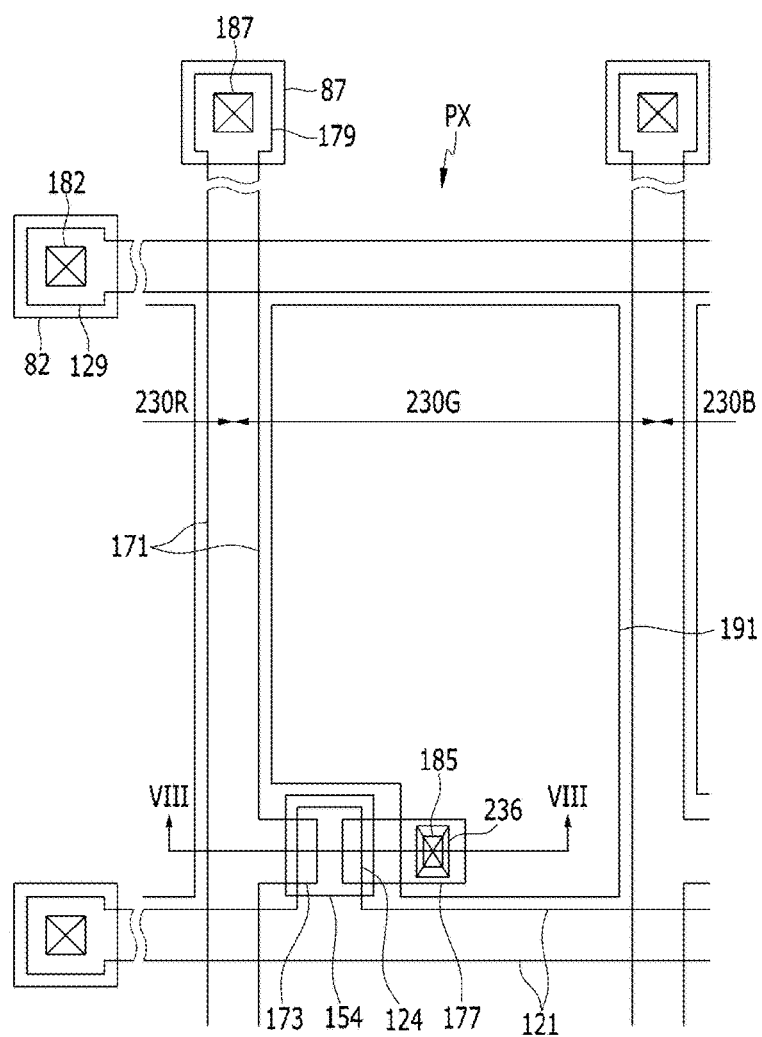
FIG. 7 is a layout view of one pixel of a liquid crystal display according to an exemplary embodiment.
Figure 8:
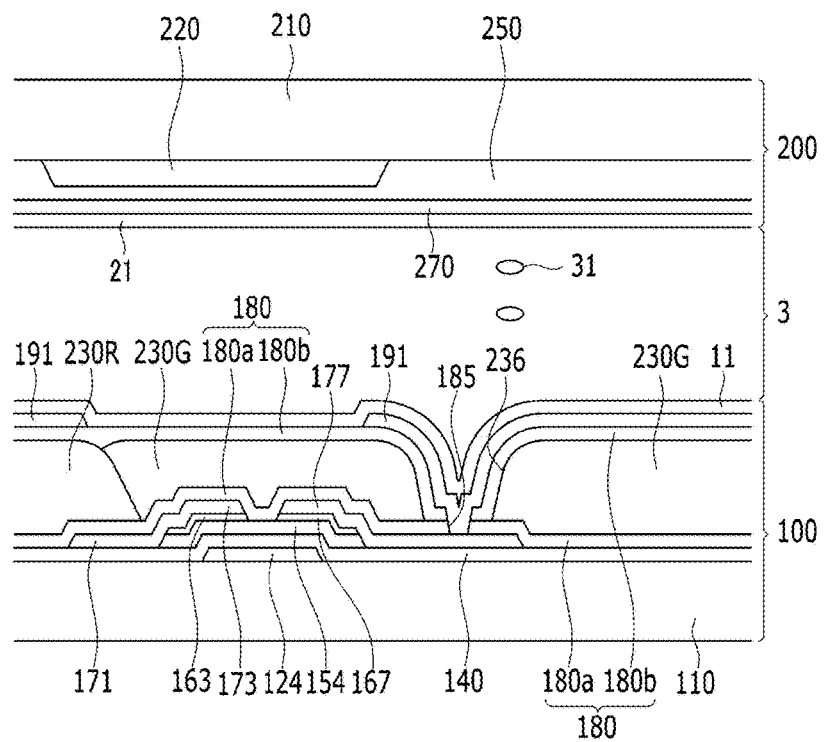
FIG. 8 is an example of a cross-sectional view illustrating the liquid crystal display of FIG. 7 taken along line VIII-VIII.

FIG. 7 is a layout view of one pixel of the liquid crystal display according to the exemplary embodiment, and FIG. 8 is an example of a cross-sectional view illustrating the liquid crystal display of FIG. 7 taken along line VIII-VIII.

The liquid crystal display according to the exemplary embodiment includes a lower panel 100 and an upper panel 200 facing each other, and a liquid crystal layer 3 interposed therebetween.

When describing the lower panel 100, a gate line 121 including a gate electrode 124 and an end portion 129 is formed on a lower substrate 110. The gate line 121 transfers a gate signal and may extend mainly in a horizontal direction. A gate insulating layer 140 is positioned on the gate line 121, and a semiconductor 154 is positioned on the gate insulating layer 140. The semiconductor 154 may include amorphous silicon, polysilicon, or an oxide semiconductor. The ohmic contacts 163 and 167, which may be made of a material such as n+ hydrogenated amorphous silicon in which n-type impurity such as phosphorus is doped at a high concentration or made of silicide, are positioned on the semiconductor 154. The ohmic contacts 163 and 167 may be omitted.

A plurality of data lines 171 and a plurality of drain electrodes 177 are formed on the ohmic contacts 163 and 167. The data line 171 transfers a data signal and mainly extends in a longitudinal direction to cross the gate line 121.

The data line 171 may include a source electrode 173 facing the drain electrode 177 and an end portion 179.

The gate electrode 124, the source electrode 173, and the drain electrode 177 form one thin film transistor (TFT) together with the semiconductor 154, and a channel of the thin film transistor is formed in the semiconductor 154 between the source electrode 173 and the drain electrode 177.

A first passivation layer 180a made of an organic insulating material, an inorganic insulating material, or the like is positioned on the data line 171 and the drain electrode 177, and color filters 230R, 230G, and 230B may be positioned thereon. The color filters 230R, 230G, and 230B may extend in a parallel direction with the data line 171 along the pixel PX column, and may include a red color filter 230R, a green color filter 230G, and a blue color filter 230B. A second passivation layer 180b formed as an inorganic insulating layer or an organic insulating layer may be positioned on the color filters 230R, 230G, and 230B. The second passivation layer 180b may prevent impurity such as pigments of the color filters 230R, 230G, and 230B from flowing into the liquid crystal layer 3.

The first passivation layer 180a and the second passivation layer 180b correspond to the passivation layer 180 of the exemplary embodiment described above. The first passivation layer 180a and the second passivation layer 180b may include a contact hole 185 extending to and exposing the drain electrode 177, and the color filters 230A, 230B, and 230C may include an opening 236 extending to and exposing the drain electrode 177. Further, the first and second passivation layers 180a and 180b include a contact hole 187 exposing the end portion 179 of the data line 171, and the gate insulating layer 140 and the first and second passivation layers 180a and 180b include a contact hole 182 exposing the end portion 129 of the gate line 121.

A pixel electrode 191 and the contact assistants 82 and 87 are positioned on the second passivation layer 180b. The pixel electrode 191 is connected with the drain electrode 177 through the contact hole 185 to receive a data voltage. The contact assistant 82 is connected to the end portion 129 of the gate line 121 through the contact hole 182, and the contact assistant 87 is connected to the end portion 179 of the data line 171 through the contact hole 187. The pixel electrode 191 and the contact assistants 82 and 87 may be made of a transparent conductive material including ITO or IZO.

Next, when describing the upper panel 200, the light blocking member 220 is positioned on the upper panel 210, and an overcoat 250 and an opposed electrode 270 may be sequentially positioned thereon. However, unlike those illustrated in FIG. 8, the light blocking member 220 may be formed on the lower panel 100.

The alignment layer 11 is coated on an inner surface of the lower panel 100, and the alignment layer 21 is coated on an inner surface of the upper panel 200. The alignment layers 11 and 21 are patterned in the peripheral area PA of the display panel 300 like the exemplary embodiment described above.

The liquid crystal layer 3 includes a plurality of liquid crystal molecules 31.

Next, an example of a structure of a pixel PX positioned in a display area DA of a liquid crystal display according to an exemplary embodiment will be described with reference to FIGS. 9 and 10.

Figure 9:
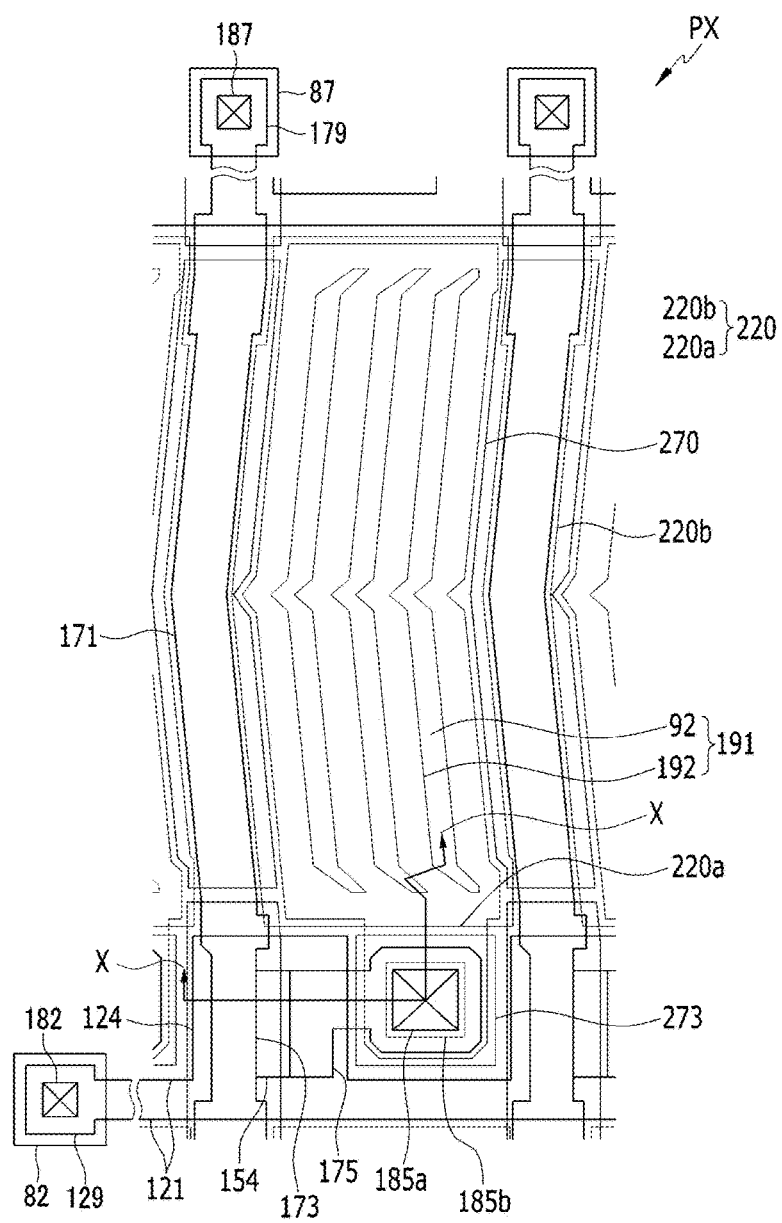
FIG. 9 is a layout view of one pixel of a liquid crystal display according to an exemplary embodiment.
Figure 10:
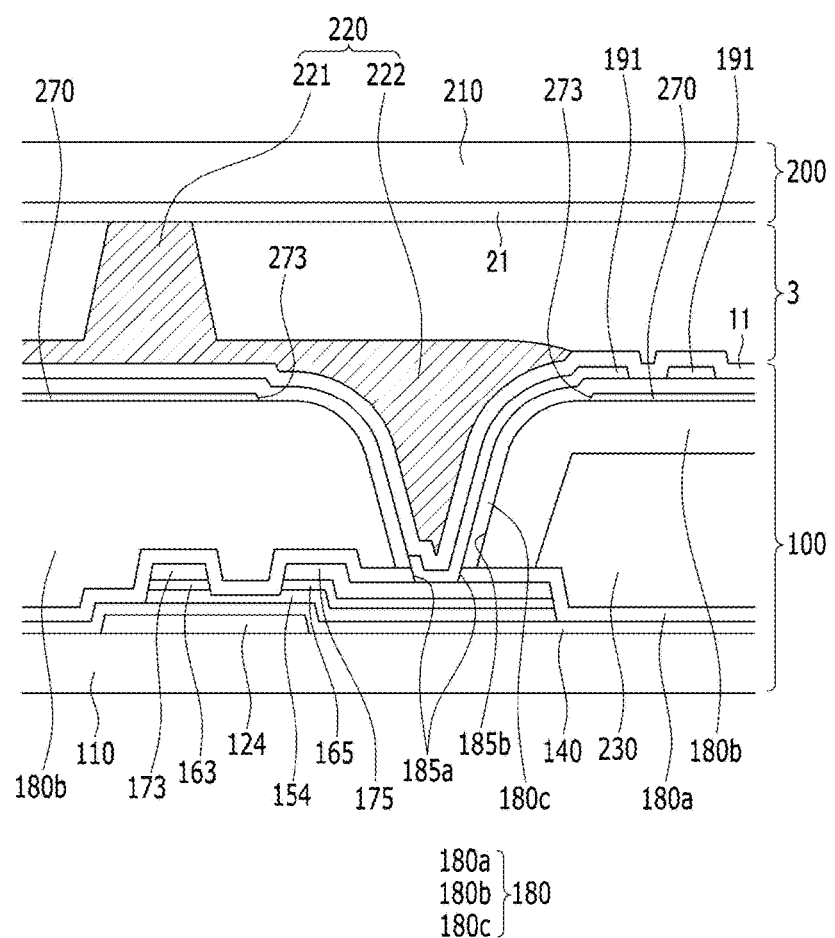
FIG. 10 is an example of a cross-sectional view illustrating the liquid crystal display of FIG. 9 taken along line X-X.

FIG. 9 is a layout view of one pixel of a liquid crystal display according to an exemplary embodiment, and FIG. 10 is an example of a cross-sectional view illustrating the liquid crystal display of FIG. 9 taken along line X-X.

The liquid crystal display according to an exemplary embodiment includes a lower panel 100 and an upper panel 200 facing each other, and a liquid crystal layer 3 injected therebetween.

The upper panel 200 includes an upper substrate 210, and an alignment layer 21 is coated on the upper substrate 210. The alignment layer 21 is patterned in the peripheral area PA of the display panel 300 like the exemplary embodiment described above.

When describing the lower panel 100, a gate conductor including a plurality of gate lines 121 is positioned on a lower substrate 110. The gate line 121 includes a gate electrode 124 and an end portion 129. A gate insulating layer 140 is positioned on the gate conductor, and a semiconductor 154 is positioned thereon. Ohmic contacts 163 and 165 are positioned on the semiconductor 154, and the data conductor including a data line 171 including a source electrode 173 and an end portion 179 and a drain electrode 175 is formed on the ohmic contacts 163 and 165 and the gate insulating layer 140. The data line 171 may be periodically curved in order to improve transmittance. The drain electrode 175 faces the source electrode 173. The drain electrode 175 may include a rob-shaped portion extending substantially in parallel with the source electrode 173, and an extension which is positioned at the opposite side thereto.

A first passivation layer 180a is positioned on the data conductor, the gate insulating layer 140, and an exposed portion of the semiconductor 154. A color filter 230 may be positioned on the first passivation layer 180a. A second passivation layer 180b as an overcoat for the color filter 230 may be positioned on the color filter 230. The second passivation layer 180b may include an opening 185b formed in a region corresponding to a part of the drain electrode 175. The second passivation layer 180b may be omitted.

An opposed electrode 270 may be positioned on the second passivation layer 180b. The opposed electrode 270 having a planar shape may be formed on the entire surface of the lower substrate 110 as a whole plate. The opposed electrodes 270 positioned in adjacent pixels PX are connected to each other to transfer a common voltage Vcom having a regular magnitude. The opposed electrode 270 may be made of a transparent conductive material such as ITO or IZO. The opposed electrode 270 may have an opening 273 formed in a region corresponding to a part of the drain electrode 175.

A third passivation layer 180c made of an organic insulating material or an inorganic insulating material may be positioned on the opposed electrode 270. The third passivation layer 180c may have a flat surface. All the first to third passivation layers 180a, 180b, and 180c correspond to the passivation layer 180 of the exemplary embodiment described above.

The first passivation layer 180a and the third passivation layer 180c may include a contact hole 185a extending to and exposing the drain electrode 175. The contact hole 185a may be positioned in the opening 185b of the second passivation layer 180b, and positioned in the opening 273 of the opposed electrode 270. Further, the first passivation layer 180a and the third passivation layer 180c include a contact hole 187 exposing the end portion 179 of the data line 171, and the first passivation layer 180a and the third passivation layer 180c, and the gate insulating layer 140 include a contact hole 182 exposing the end portion 129 of the gate line 121.

The pixel electrode 191 and the contact assistants 82 and 87 are positioned on the third passivation layer 180c. The pixel electrode 191 may include a plurality of branch electrodes 192 overlapping the opposed electrode 270. A slit 92 in which an electrode is removed is formed between the adjacent branch electrodes 192. The branch electrode 192 of the pixel electrode 191 may extend substantially in parallel to the data line 171. The pixel electrode 191 is physically and electrically connected to the drain electrode 175 through the contact hole 185 to receive a voltage from the drain electrode 175. The contact assistant 82 is connected to the end portion 129 of the gate line 121 through the contact hole 182, and the contact assistant 87 is connected to the end portion 179 of the data line 171 through the contact hole 187.

According to another exemplary embodiment, a laminating position of the pixel electrode 191 and the opposed electrode 270 may be changed. In this case, the pixel electrode 191 may be a planar shape which fills most of the pixel PX area, and the opposed electrode 270 may include a plurality of branch electrodes (not illustrated) overlapping the pixel electrode 191.

An alignment layer 11 is coated on the pixel electrode 191, and the alignment layer 11 is patterned in the peripheral area PA of the display panel 300 like the exemplary embodiment described above.

The light blocking member 220 according to the exemplary embodiment may be positioned on the alignment layer 11. However, unlike those illustrated in the drawing, the laminated position of the light blocking member 220 and the alignment layer 11 may be changed.

The light blocking member 220 may include a spacer 221 and a main light blocking portion 222. The spacer 221 may maintain a separation distance between the lower panel 100 and the upper panel 200. The main light blocking portion 222 has a smaller thickness than the spacer 221. The main light blocking portion 222 may include a first light blocking portion 220a covering the gate line 121 and extending substantially parallel to the gate line 121, and a second light blocking portion 220b covering the data line 171 and extending substantially parallel to the data line 171. The first light blocking portion 220a includes a portion covering a thin film transistor, and may include a portion covering the contact hole 185a exposing the drain electrode 175. Accordingly, the light blocking member 220 may planarize the surface by filling a large step around the contact hole 185a and prevent light leakage around the contact hole 185a.

The liquid crystal layer 3 includes liquid crystal molecules (not illustrated) having dielectric anisotropy. The liquid crystal molecules may be aligned so that long axes thereof are parallel to the display panels 100 and 200 without applying the electric field to the liquid crystal layer 3, and in this case, the liquid crystal molecules may have positive dielectric anisotropy.

The pixel electrode 191 may receive a data voltage through a thin film transistor, and the opposed electrode 270 may receive a common voltage Vcom. Then, the pixel electrode 191 and the opposed electrode 270 generate an electric field in the liquid crystal layer 3 and thus the liquid crystal molecules are rearranged. Polarization of light passing through the liquid crystal layer 3 varies according to the rearranged liquid crystal molecules, thereby displaying an image with desired luminance. The branch electrode 192 of the pixel electrode 191 according to the exemplary embodiment generates a fringe field in the liquid crystal layer 3 together with the opposed electrode 270 to determine alignment directions of the liquid crystal molecules.

Next, an example of a structure of a pixel PX positioned in a display area DA of a liquid crystal display according to an exemplary embodiment will be described with reference to FIGS. 9 and 11.

Figure 11:
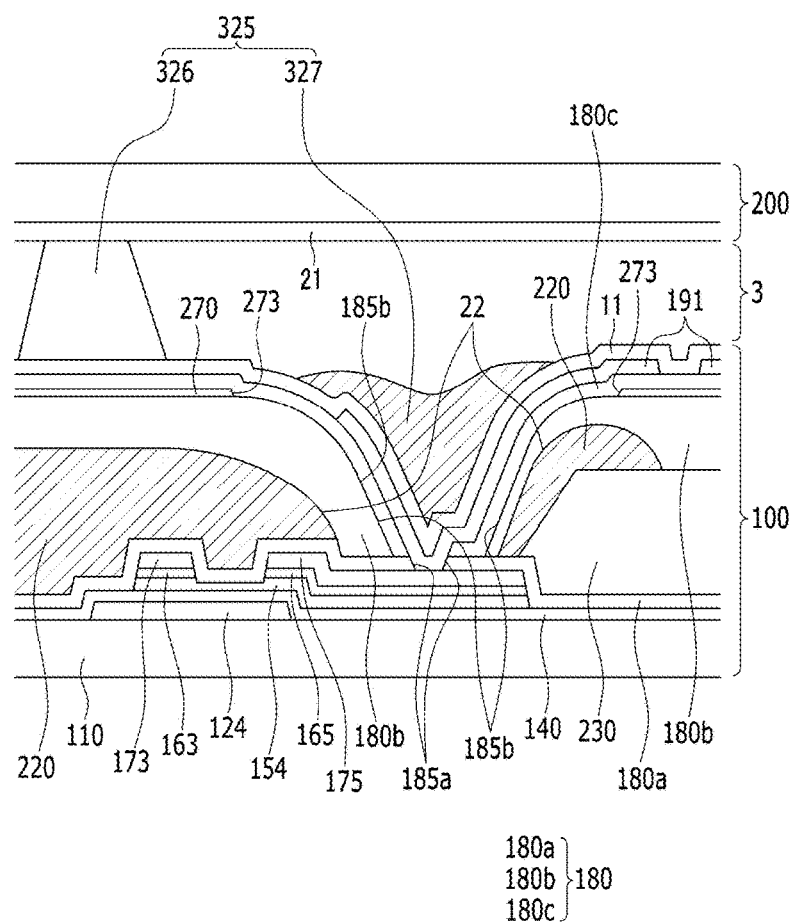
FIG. 11 is an example of a cross-sectional view illustrating a liquid crystal display according to an exemplary embodiment.

FIG. 11 is an example of a cross-sectional view illustrating a liquid crystal display according to an exemplary embodiment.

Since the liquid crystal display according to the exemplary embodiment is almost the same as the exemplary embodiment illustrated in FIGS. 9 and 10 described above, differences will be mainly described.

First, when describing the lower panel 100, a gate line 121 including a gate electrode 124 is formed on a lower substrate 110, and a gate insulating layer 140 is positioned thereon. A semiconductor 154 and ohmic contacts 163 and 165 may be formed on the gate insulating layer 140. A data conductor including a data line 171 including a source electrode 173 and a drain electrode 175 is formed on the ohmic contacts 163 and 165 and the gate insulating layer 140. A first passivation layer 180a may be positioned on the data conductor, the gate insulating layer 140, and an exposed portion of the semiconductor 154.

A color filter 230 and a light blocking member 220 may be positioned on the first passivation layer 180a. The light blocking portion 220 may include a first light blocking portion 220a covering the gate line 121 and extending substantially parallel to the gate line 121, and a second light blocking portion 220b covering the data line 171 and extending substantially parallel to the data line 171.

A second passivation layer 180b may be positioned on the color filter 230 and the light blocking member 220. The second passivation layer 180b may include an opening 185b formed in a region corresponding to a part of the drain electrode 175. The opening 185b of the second passivation layer 180b may be positioned in an opening 22 of the light blocking member 220.

An opposed electrode 270 may be positioned on the second passivation layer 180b. The opposed electrode 270 may have an opening 273 formed in a region corresponding to a part of the drain electrode 175. A third passivation layer 180c may be positioned on the opposed electrode 270

The first passivation layer 180a and the third passivation layer 180c include a contact hole 185a exposing the drain electrode 175. The contact hole 185a may be positioned in the opening of the opposed electrode 270 and the opening 22 of the light blocking member 220. A pixel electrode 191 may be positioned on the third passivation layer 180c.

An alignment layer 11 is coated on the pixel electrode 191, and the alignment layer 11 is patterned in the peripheral area PA of the display panel 300 like the exemplary embodiment described above.

A plurality of colored members 325 may be further positioned on the alignment layer 11. However, unlike those illustrated in the drawing, the laminated positions of the light blocking member 220 and the alignment layer 11 may be changed.

The colored member 325 may include an auxiliary light blocking portion 327 which is positioned at a place corresponding to the contact hole 185a to cover the contact hole 185a to compensate a step and prevent light leakage. Further, the colored member 325 may further include a spacer 326 which may maintain a separation distance between the lower panel 100 and the upper panel 200. The spacer 326 and the auxiliary light blocking portion 327 may be separated from each other or connected to each other. The colored member 325 may include a pigment such as black carbon, and include a photosensitive organic material.

Like the exemplary embodiment illustrated in FIGS. 9 to 11, when the opposed electrode 270 is not positioned on the upper substrate 210, the short point 320 may be omitted in the peripheral area PA.

Hereinafter, a liquid crystal display according to an exemplary embodiment will be described with reference to FIGS. 12A and 12B together with the drawings described above.

Figure 12A:
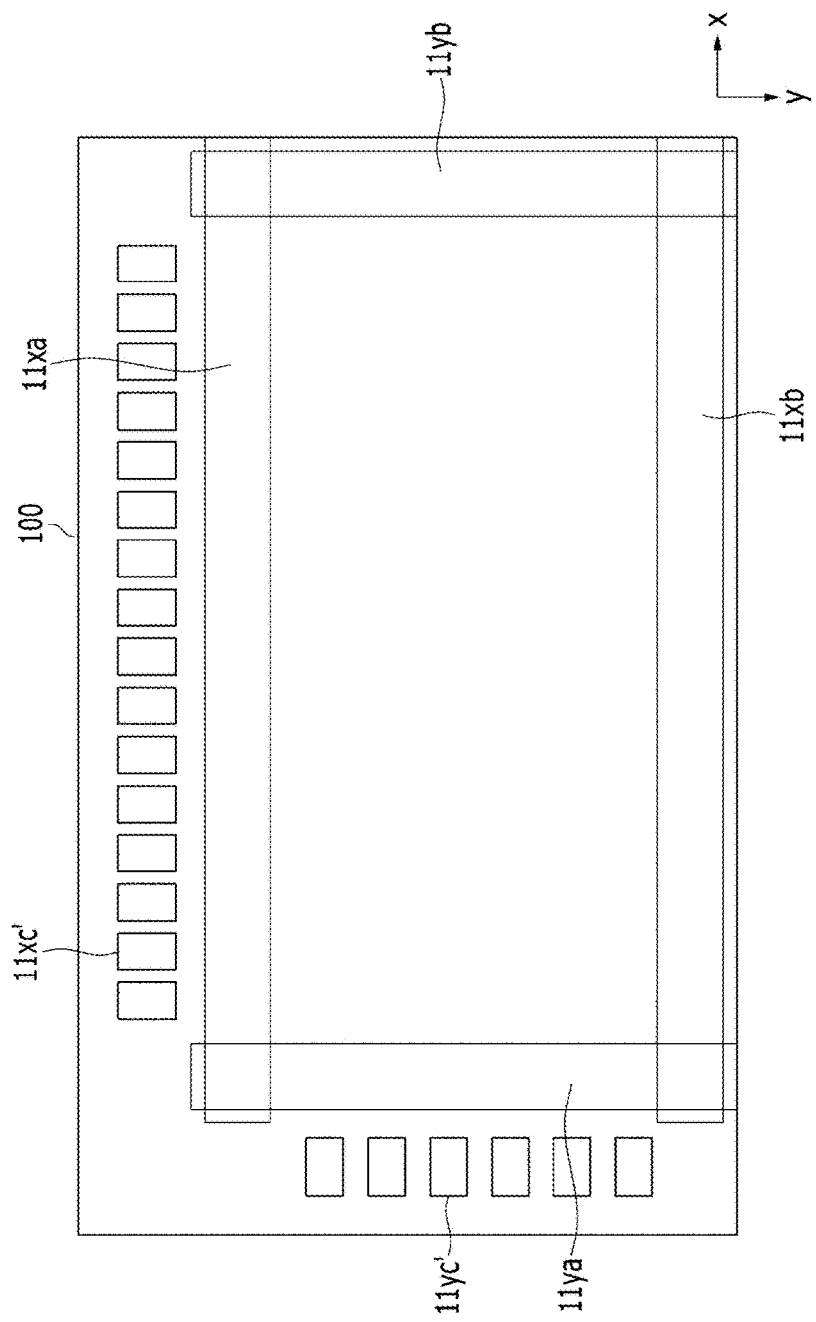
FIG. 12A is a plan view of a lower panel of a liquid crystal display according to an exemplary embodiment.
Figure 12B:
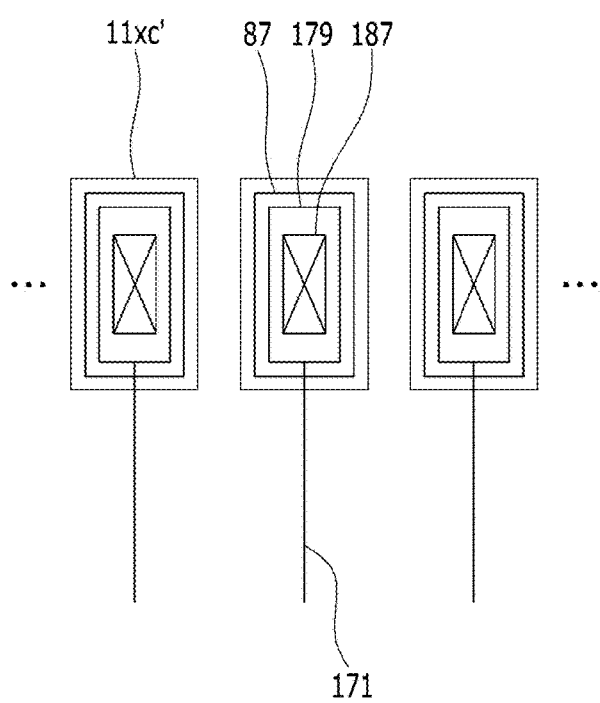
FIG. 12B is an enlarged view of a part of FIG. 12A.

FIG. 12A is a plan view of a lower panel of a liquid crystal display according to an exemplary embodiment, and FIG. 12B is an enlarged view of a part of FIG. 12A.

Referring to FIG. 12A, the liquid crystal display according to the exemplary embodiment is almost the same as the exemplary embodiment illustrated in FIGS. 1A to 6 described above, but the removed region of the alignment layer 11 overlapping an end portion of the signal line of the lower panel 100 may be different.

The alignment layer 11 of the lower panel 100 according to the exemplary embodiment may include a plurality of removed portions 11xc' overlapping each contact assistant 87 connected to the end portion 179 of the data line 171, and a coated region of the alignment layer 11 exists between the removed portions 11xc'. The plurality of removed portions 11xc' may be arranged in an x direction in series. Similarly, the alignment layer 11 may include a plurality of removed portions 11yc' overlapping each contact assistant 82 connected to the end portion 129 of the gate line 121, and a coated region of the alignment layer 11 exists between the removed portions 11yc'. The plurality of removed portions 11yc' overlapping the contact assistant 82 may be arranged in a y direction in series. That is, the respective contact assistants 82 and 87 include the removed portions 11xc' and 11yc' which are not covered by the coated region of the alignment layer 11 but exposed, and the plurality of removed portions 11xc' and 11yc' may be separated from each other. The removed portions 11xc' and 11yc' may be larger than the contact assistants 82 and 87 as illustrated in FIG. 12B, but are not limited thereto. Even in the exemplary embodiment, a distance d3 between the removed portions 11xc' and 11yc' overlapping the respective contact assistants 82 and 87 and separated from each other and the removed regions 11xa and 11ya adjacent thereto is larger than 0.

Hereinafter, a manufacturing method of a liquid crystal display according to an exemplary embodiment will be described with reference to FIGS. 13 to 25 together with the drawings described above.

Figure 18:
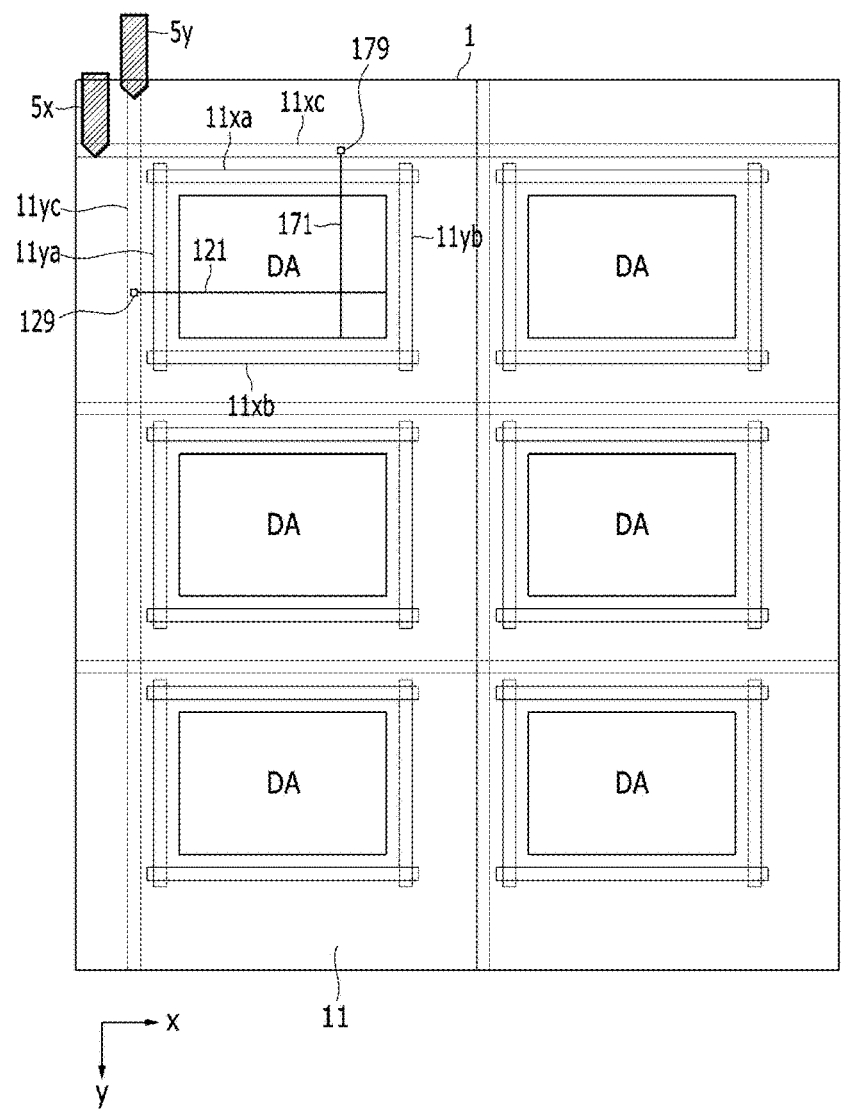
Figure 19:
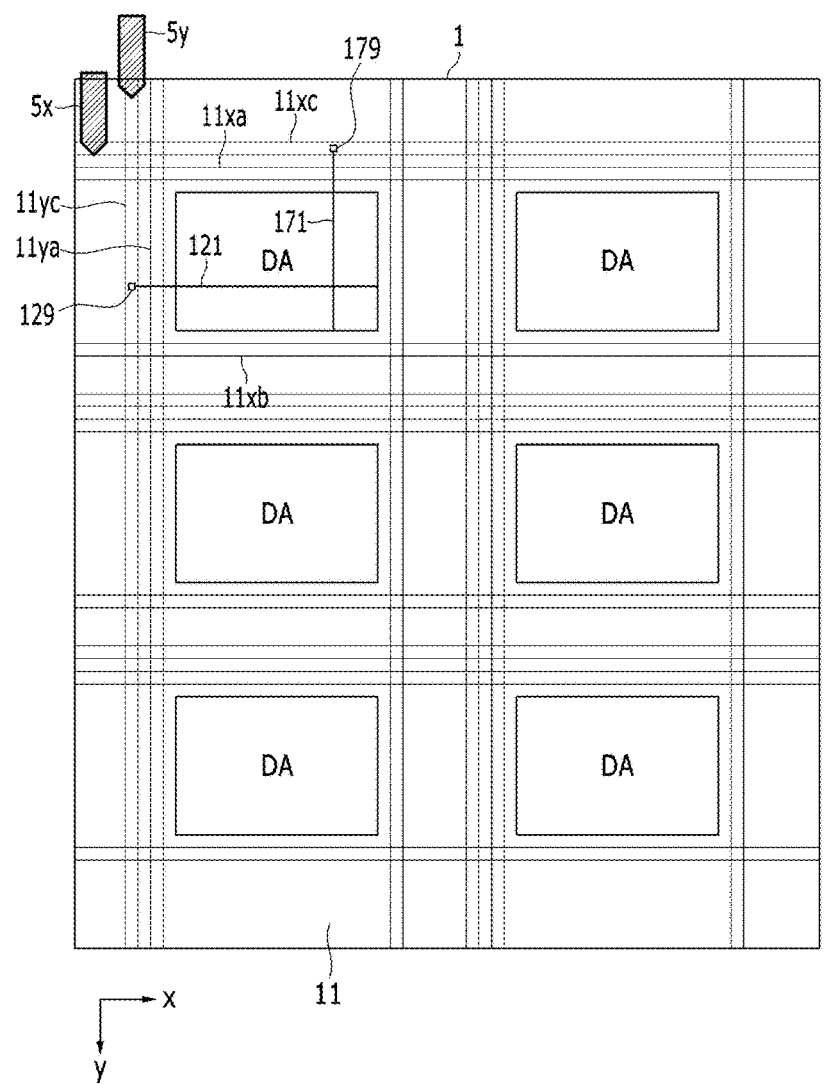
Figure 20:
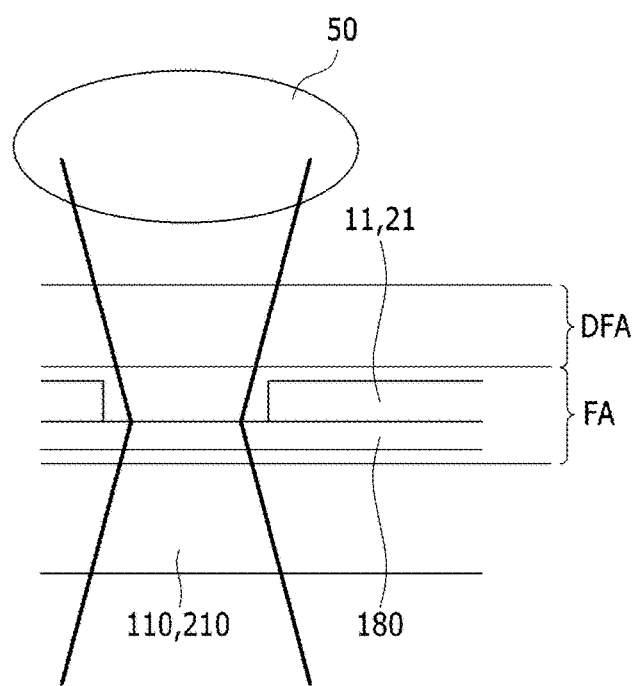
FIG. 20 is a cross-sectional view illustrating a method of selectively removing an alignment layer by using a laser in the manufacturing method of the liquid crystal display according to the exemplary embodiment.

FIGS. 13 to 19 are layout views illustrating coating and patterning of an alignment layer on lower and upper mother substrates among intermediate operations of a manufacturing method of a liquid crystal display according to an exemplary embodiment, FIG. 20 is a cross-sectional view illustrating a method of selectively removing an alignment layer by using a laser in the manufacturing method of the liquid crystal display according to the exemplary embodiment, and FIGS. 21 to 25 are layout views illustrating a lower panel or an upper panel generated by cutting lower and upper mother substrates by a cell unit in the manufacturing method of the liquid crystal display according to the exemplary embodiment.

Figure 13:
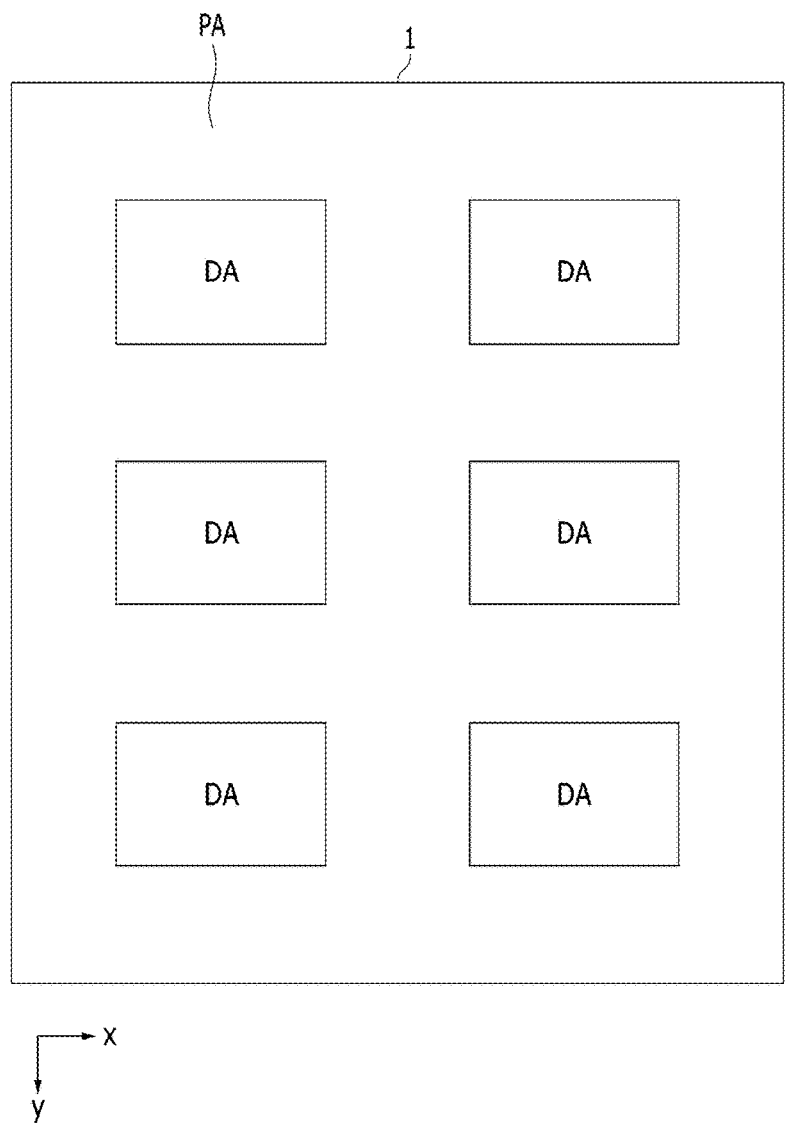
FIGS. 13, 14, 15, 16, 17, 18, and 19 are layout views illustrating coating and patterning of an alignment layer on lower and upper mother substrates among intermediate operations of a manufacturing method of a liquid crystal display according to an exemplary embodiment.
Figure 14:
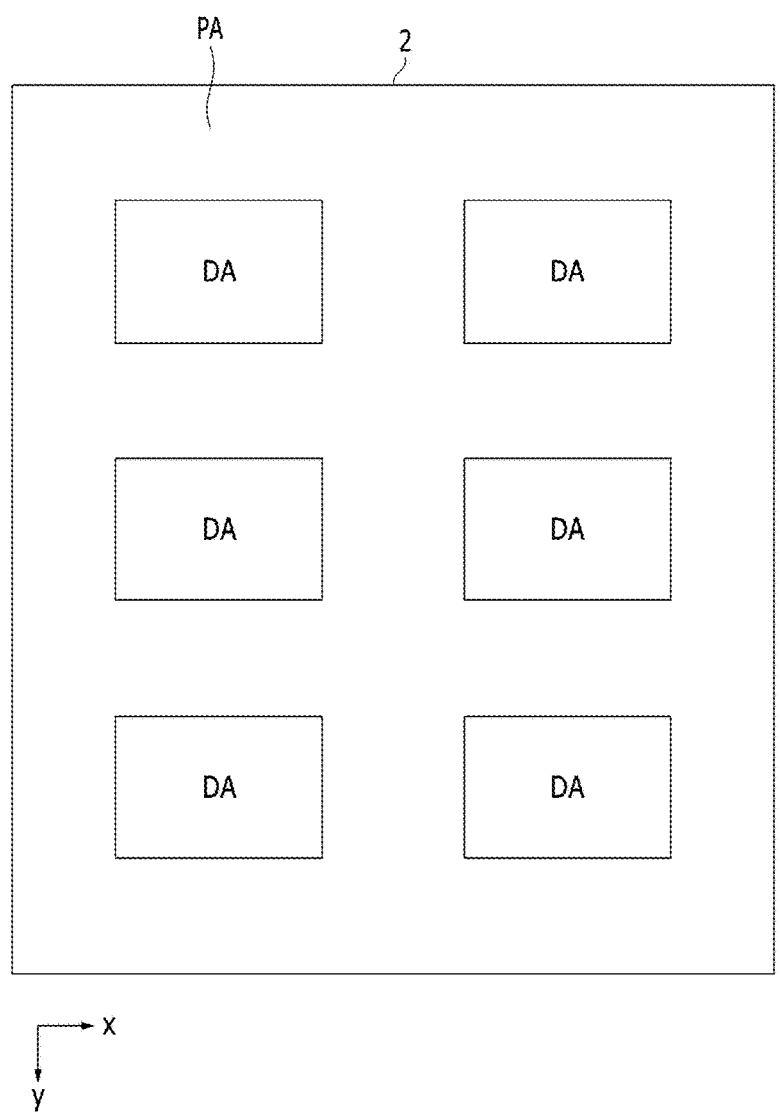

First, referring to FIGS. 13 and 14, a plurality of display areas DA arranged substantially in a matrix form by forming a thin film transistor and the like, and a peripheral area PA therearound are formed on a lower mother substrate 1. A plurality of display areas DA and a plurality of peripheral areas PA corresponding to the lower mother substrate 1 are formed on an upper mother substrate 2. Since the description for the display area DA and the peripheral area PA is the same as those described above, the detailed description is omitted.

Figure 15:
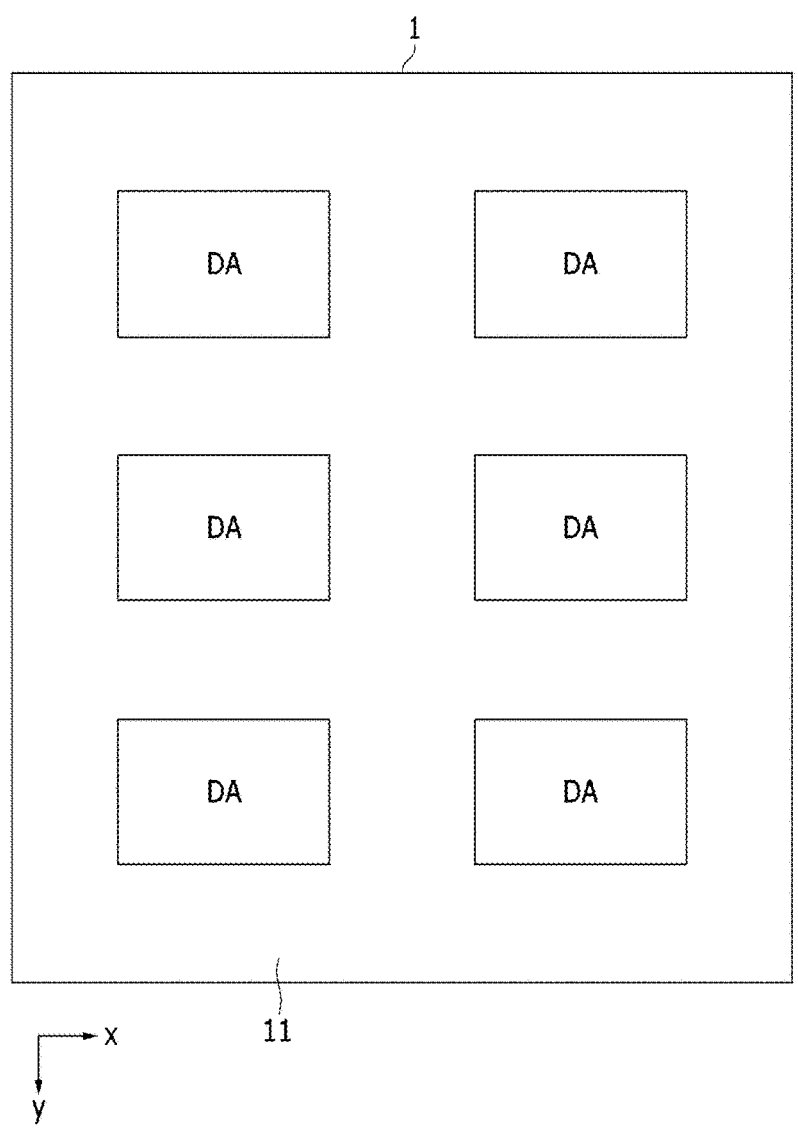
Figure 16:
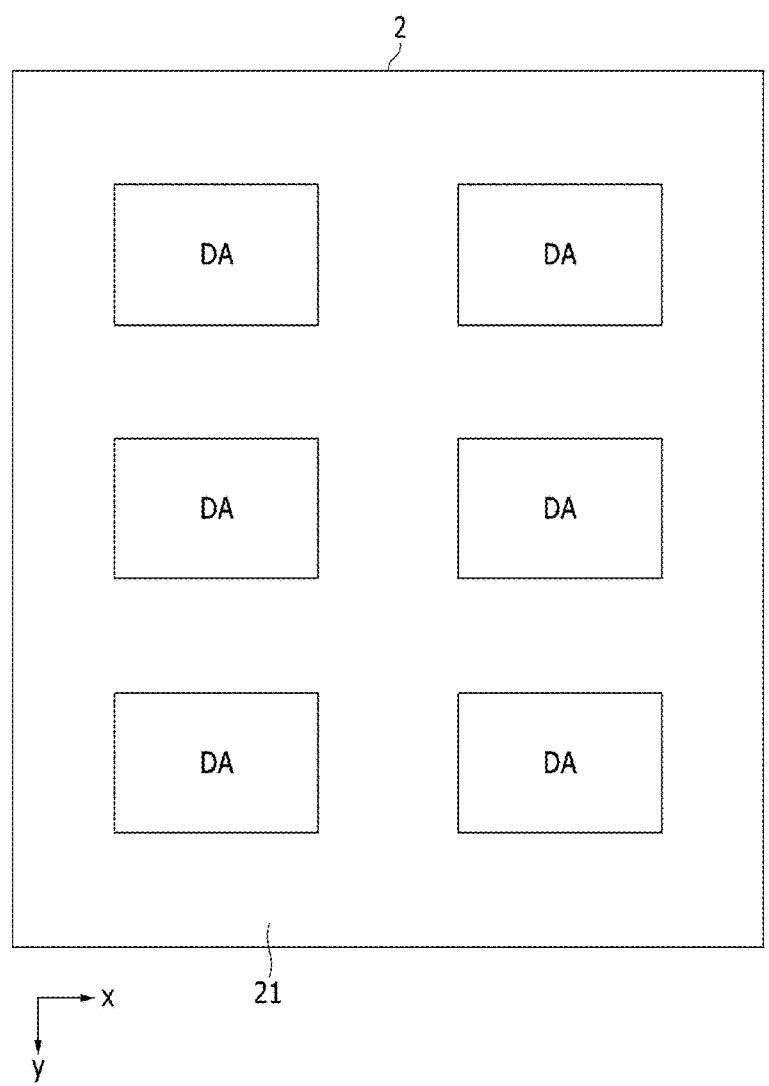

Next, referring to FIGS. 15 and 16, an aligning agent is coated and dried on the entire surface of the lower mother substrate 1 and the upper mother substrate 2 by using a method such as inkjet printing or spin coating to form alignment layers 11 and 21. Thereafter, the alignment layers 11 and 21 may be further subjected to a rubbing process.

Figure 17:
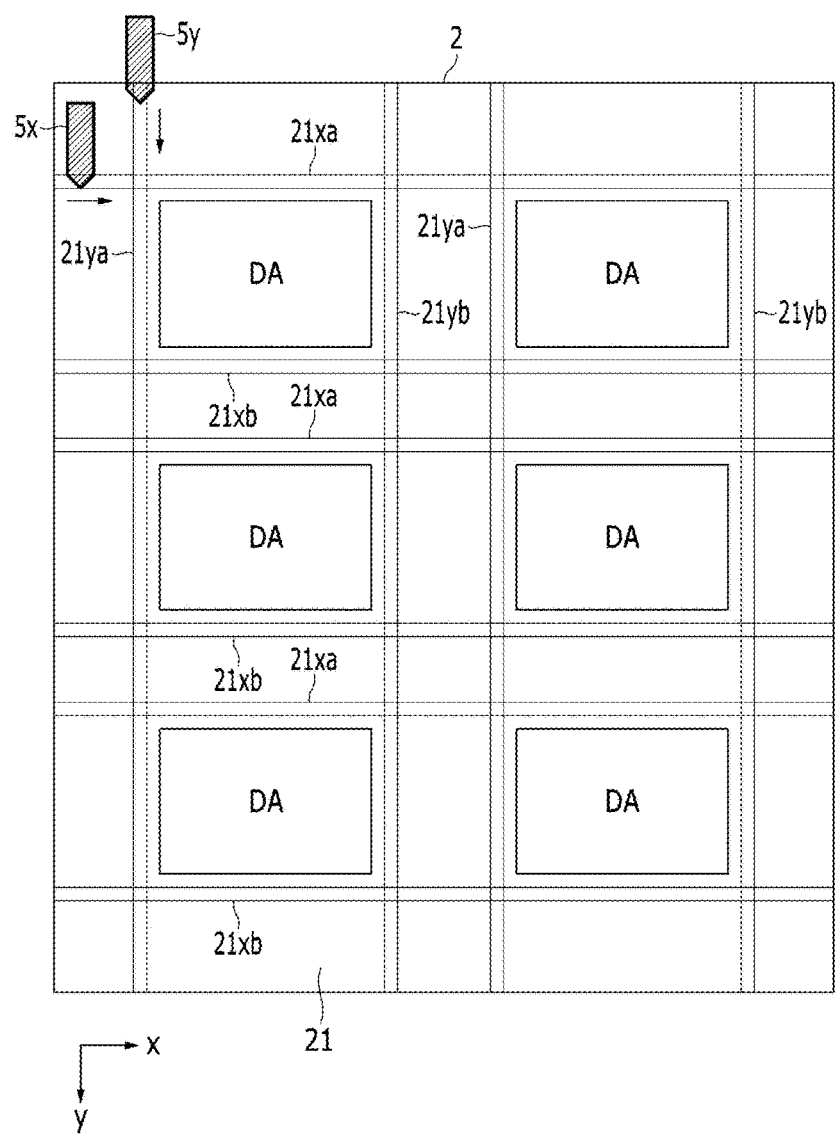

Next, referring to FIGS. 17 to 19, the alignment layers 11 and 21 are patterned by using a laser beam.

The laser beam reacts with an alignment material such as polyimide included in the alignment layers 11 and 21 and burns the alignment material to selectively remove a part of the alignment layers 11 and 21. A laser beam irradiating apparatus may generate a laser beam having a wavelength of about 200 nm to about 600 nm, but is not limited thereto. The laser beam irradiating apparatus may be an excimer laser beam irradiating apparatus using argon (Ar) as main reaction gas, but is not limited thereto.

The laser beam irradiating apparatus may include at least two laser beam irradiating units 5x and 5y irradiating laser beams. The laser beam irradiating unit 5x may be provided singly or in plural. The laser beam irradiating unit 5x moves in an x direction to irradiate the laser beam. The laser beam irradiating unit 5y may also be provided singly or in plural, and moves in a y direction to irradiate the laser beam. The laser beam irradiating units 5x and 5y may straightly move in the x direction and the y direction, respectively. Each of the laser beam irradiating unit 5x and the laser beam irradiating unit 5y moves only in one direction to be driven, and may reciprocally move to be driven.

The laser beam irradiating unit 5x and the laser beam irradiating unit 5y may be driven simultaneously or at different times. For example, the laser beam irradiating unit 5x is first driven, and then the laser beam irradiating unit 5y may start to be driven while the laser beam irradiating unit 5x is driven, and vice versa. Alternatively, the laser beam irradiating unit 5x and the laser beam irradiating unit 5y may start to be simultaneously driven. Unlike this, the driving times of the laser beam irradiating unit 5x and the laser beam irradiating unit 5y may be different from each other.

Respective speeds of the laser beam irradiating unit 5x and the laser beam irradiating unit 5y may vary according to laser conditions such as a size, intensity, and the like of the laser beam, and various process conditions, such as sizes of the removed regions of the alignment layers 11 and 21 to be formed and thicknesses of the alignment layers 11 and 21. The laser conditions may be changed by controlling power, a pulse frequency, a wavelength, a focal distance, a laser beam size, and the like of the laser beam irradiating apparatus.

Referring to FIG. 20, the laser beam irradiating apparatus includes a lens 50, and intensity, a size, and the like of the laser beam irradiated to the alignment layers 11 and 21 to be removed may be controlled by controlling a focus position of the lens 50. For example, when the passivation layer 180 and the alignment layers 11 and 21 are positioned on the lower substrate 110 or the upper substrate 210, the alignment layers 11 and 21 are adjusted to be positioned in a focused area (FA) where a focus is positioned or to be positioned in a defocused area (DFA), and as a result, the size, the intensity, and the like of the laser beam irradiated to the alignment layers 11 and 21 to be removed may be controlled.

Referring back to FIG. 17, the laser beam irradiating unit 5x irradiates the laser beam to the alignment layer 21 of the upper mother substrate 2 to form the removed region 21xa and 21xb around each display area DA, and the laser beam irradiating unit 5y irradiates the laser beam to the alignment layer 21 of the upper mother substrate 2 to form the removed regions 21ya and 21yb around each display area DA. The laser beam irradiating units 5x and 5y continuously irradiate the laser beams while straightly moving at a predetermined speed from one edge to an opposing edge of the upper mother substrate 2. Accordingly, a time of patterning the alignment layer 21 is minimized. As a result, the removed regions 21xa, 21xb, 21ya, and 21yb may have uniform widths in a continuous straight form extending between the opposing edges of the upper mother substrate 2.

Referring to FIG. 18, the laser beam irradiating unit 5x irradiates the laser beam to the alignment layer 11 of the lower mother substrate 1 to form the removed regions 11xa, 11xb, and 11xc around each display area DA, and the laser beam irradiating unit 5y irradiates the laser beam to the alignment layer 11 of the lower mother substrate 1 to form the removed regions 11ya, 11yb, and 11yc around each display area DA. The laser beam irradiating units 5x and 5y continuously irradiate the laser beams while straightly moving at a predetermined speed from one edge to an opposing edge of the lower mother substrate 1. In this case, the removed regions 11xc and 11yc may have uniform widths in a continuous straight form extending between the opposing edges of the lower mother substrate 1.

Unlike this, the laser beam irradiating units 5x and 5y may intermittently stop the laser beams irradiation while straightly moving at a predetermined speed from one edge to an opposing edge of the lower mother substrate 1 and irradiating the laser beams. As a result, the removed regions 11xa, 11xb, 11ya, and 11yb which do not meet the removed regions 11xc and 11yc and are positioned only around each display area DA may be formed.

Unlike those illustrated in FIG. 18, referring to FIG. 19, in order to form the removed regions 11xa, 11xb, 11ya, and 11yb which cross the removed regions 11xc and 11yc and are formed continuously with uniform widths between the opposing edges of the lower mother substrate 1, the laser beam irradiating units 5x and 5y may continuously irradiate the laser beams while straightly moving at a predetermined speed from one edge to an opposing edge of the lower mother substrate 1.

Next, a short point 320 and a sealant 310 are formed on the lower mother substrate 1 or the upper mother substrate 2, and a liquid crystal material is injected on the mother substrates 1 and 2 or the remaining mother substrate 1 or 2 by using an inkjet method and the like.

Next, the lower mother substrate 1 and the upper mother substrate 2 are boned to each other and cut by a cell unit to form a plurality of upper panels 200 and lower panels 100 which are boned to each other.

Figure 21:
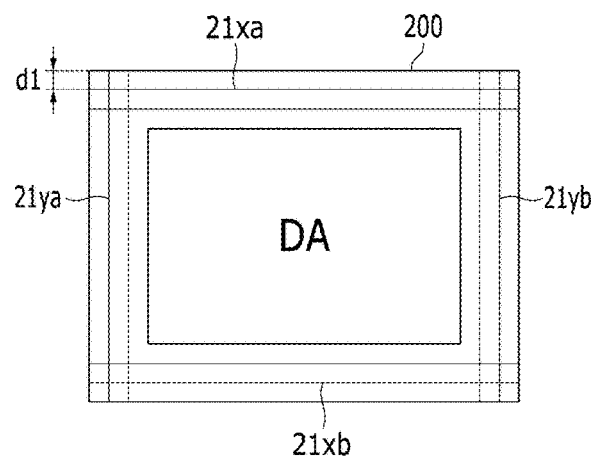
FIGS. 21, 22, 23, 24, and 25 are layout views illustrating a lower panel or an upper panel generated by cutting lower and upper mother substrates by a cell unit in the manufacturing method of the liquid crystal display according to the exemplary embodiment.

Next, referring to FIG. 21, the two removed regions 21xa, 21xb, 21ya, and 21yb adjacent to each other and crossing each other in the upper panel 200 may cross each other or not as described above. FIG. 21 illustrates an example in which the two removed regions 21xa, 21xb, 21ya, and 21yb adjacent to each other cross each other in the cross region and each of the removed regions 21xa, 21xb, 21ya, and 21yb includes a protrusion, and a length d1 of the protrusion is larger than 0.

Figure 22:
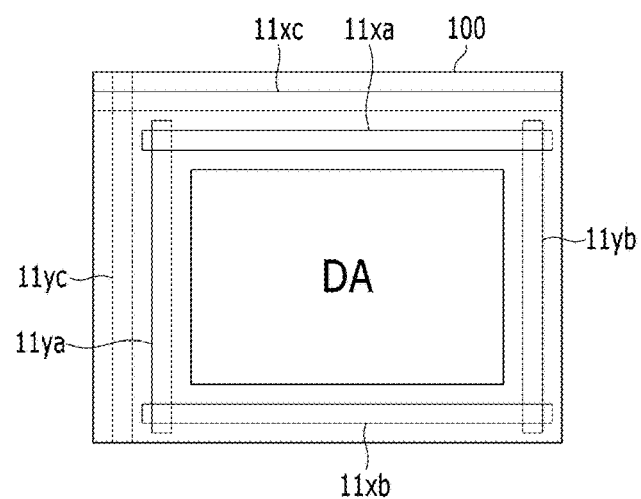

FIG. 22 illustrates an example in which the two removed regions 11xc and 11yc cross each other and are cut to have a shape of "╋" or "┽", or a rotated form thereof in the cross region, as the lower panel 100 formed after patterning the alignment layer 11 of the lower mother substrate 1 according to the exemplary embodiment illustrated in FIG. 18 described above. As a result, the coated region of the alignment layer 11 may exist between the removed regions 11xc and 11yc and at least two edges of the lower panel 100 adjacent thereto. The exemplary embodiment is almost the same as the exemplary embodiment illustrated in FIG. 1A described above.

Figure 23:
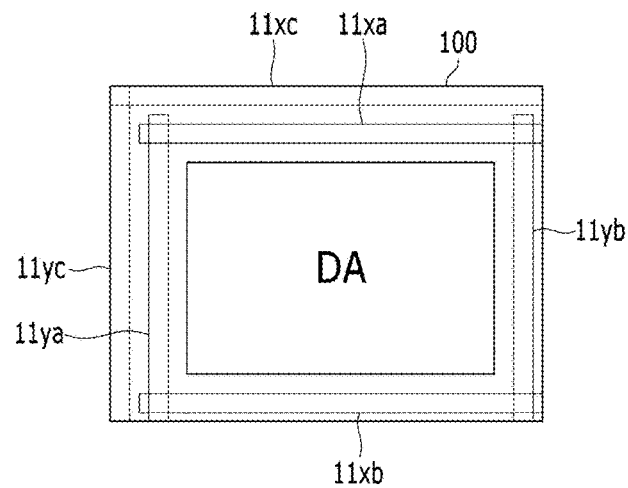

FIG. 23 illustrates an example in which the two removed regions 11xc and 11yc are cut to have a shape of "┐" or a rotated form thereof in the cross region, as the lower panel 100 formed after patterning the alignment layer 11 of the lower mother substrate 1 according to the exemplary embodiment illustrated in FIG. 18 described above. As a result, the coated region of the alignment layer 11 may not exist between the removed regions 11xc and 11yc and at least two edges of the lower panel 100 adjacent thereto. Further, as illustrated in FIG. 23, the lower mother substrate 1 may be cut so that the protrusions of the removed regions 11xb and 11yb remain in the cross region of the removed regions 11xb and 11yb. However, unlike this, the lower mother substrate 1 may also be cut so that the protrusions of the removed regions 11xb and 11yb do not remain in the cross region of the removed regions 11xb and 11yb, and the alignment layer 11 does not remain at the edge of the lower panel 100.

Figure 24:
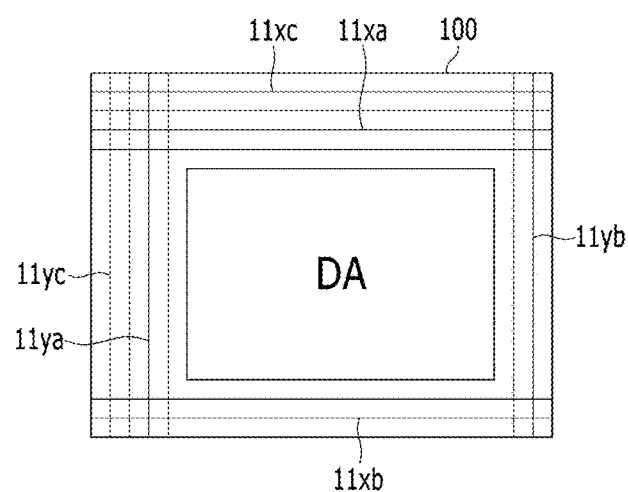

FIG. 24 illustrates an example in which the two removed regions 11xc and 11yc cross each other to be cut to have a shape of "╋" or "┽", or a rotated form thereof in the cross region, as the lower panel 100 formed after patterning the alignment layer 11 of the lower mother substrate 1 according to the exemplary embodiment illustrated in FIG. 19 described above. As a result, the coated region of the alignment layer 11 may exist between the removed regions 11xc and 11yc and at least two edges of the lower panel 100 adjacent thereto.

Figure 25:
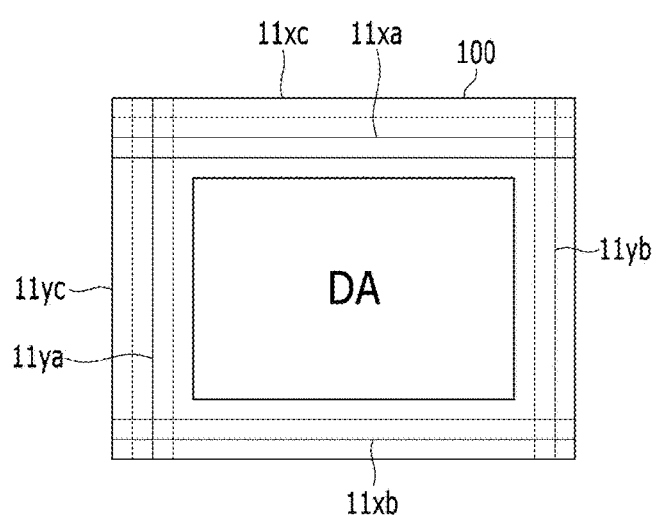

FIG. 25 illustrates an example in which the two removed regions 11xc and 11yc are cut to have a shape of "┐" or a rotated form thereof in the cross region, as the lower panel 100 formed after patterning the alignment layer 11 of the lower mother substrate 1 according to the exemplary embodiment illustrated in FIG. 19 described above. As a result, the coated region of the alignment layer 11 may not exist between the removed regions 11xc and 11yc and at least two edges of the lower panel 100 adjacent thereto. Further, as illustrated in FIG. 25, the lower mother substrate 1 may be cut so that the protrusions of the removed regions 11xb and 11yb remain in the cross region of the removed regions 11xb and 11yb. However, unlike this, the lower mother substrate 1 may also be cut so that the protrusions of the removed regions 11xb and 11yb do not remain in the cross region of the removed regions 11xb and 11yb, and the alignment layer 11 does not remain at the edge of the lower panel 100.

According to another exemplary embodiment, the lower mother substrate 1 and the upper mother substrate 2 may be cut to form the sealant 310, and the lower panel 100 and the upper panel 200 may be bonded to each other and then a liquid crystal material may be injected therebetween.

As such, according to the manufacturing method of the liquid crystal display according to the exemplary embodiment, since the alignment layers 11 and 21 are selectively removed after coating the alignment layers 11 and 21 on the entire surface of the lower mother substrate 1 and the upper mother substrate 2, the manufacturing time may be reduced, and a display defect may be removed by increasing uniformity of the alignment layers 11 and 21. Further, when the alignment layers 11 and 21 are patterned by using the laser beam, the laser beam is straightly driven on the lower mother substrate 1 or the upper mother substrate 2 to minimize the patterning time. Further, since the removed region of the alignment layer 11 overlapping the sealant 310 and the removed region of the alignment layer 11 overlapping the end portion of the signal line are formed through a separate laser beam irradiating process, the region to which the laser beam is irradiated may be decreased, and the manufacturing time of the liquid crystal display may be reduced by patterning the alignment layer 11 within a short time with small energy.

Hereinafter, a liquid crystal display according to an exemplary embodiment will be described with reference to FIGS. 26 to 28 together with the drawings described above.

Figure 26:
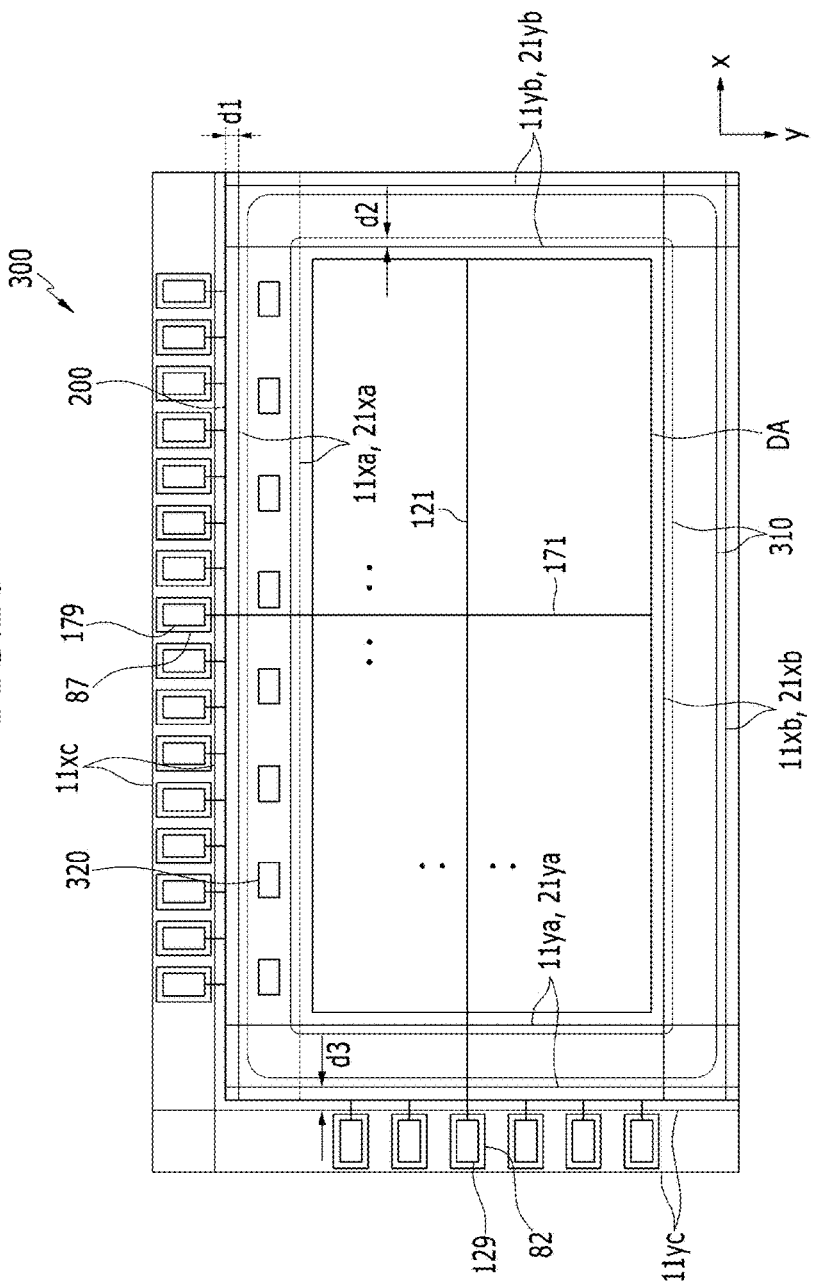
FIGS. 26, 27, 28 are layout views of a liquid crystal display according to an exemplary embodiment, respectively.
Figure 27:
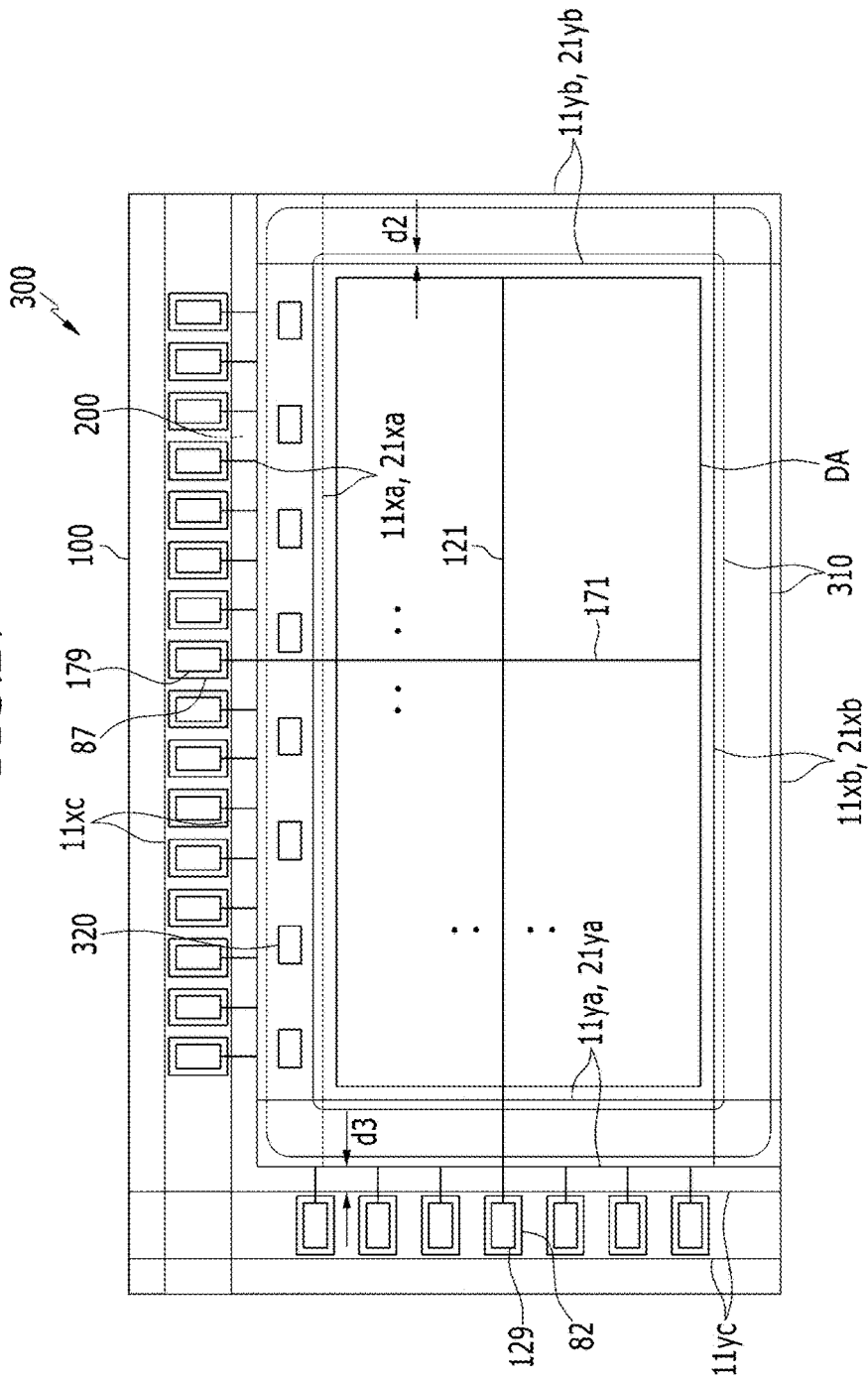
Figure 28:
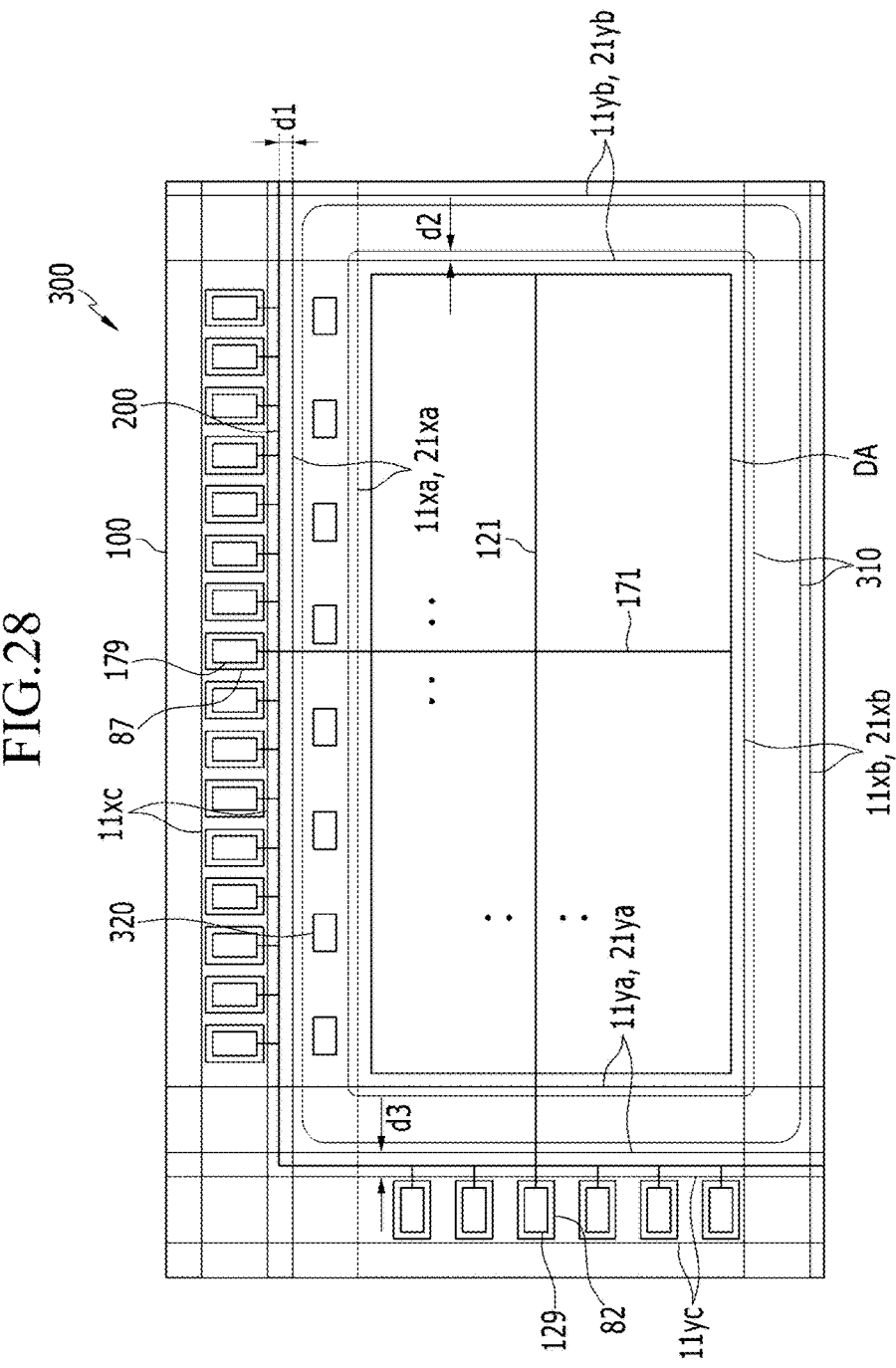

FIGS. 26 to 28 are layout views of a liquid crystal display according to an exemplary embodiment, respectively.

First, referring to FIG. 26, the liquid crystal display according to the exemplary embodiment is almost the same as the exemplary embodiment illustrated in FIGS. 1A to 6 described above, but includes the lower panel 100 formed according to the cutting method illustrated in FIG. 23 described above. Accordingly, two removed regions 11xc and 11yc have a shape of "⏋" or a rotated form thereof in the cross region, and the coated region of the alignment layer 11 does not exist between the removed regions 11xc and 11yc of the alignment layer 11 and at least two edges of the lower panel 100 adjacent thereto. Further, as illustrated in the drawing, the protrusions of the removed regions 11xb and 11yb or the removed regions 21xb and 21yb may remain in the cross region of the removed regions 11xb and 11yb or the cross region of the removed regions 21xb and 21yb. However, unlike this, in the cross region of the removed regions 11xb and 11yb or the removed regions 21xb and 21yb, the protrusions of the removed regions 11xb and 11yb or removed regions 21xb and 21yb may not remain, and the alignment layers 11 and 21 may not remain at the edges of the lower panel 100 and the upper panel 200.

Next, referring to FIG. 27, the liquid crystal display according to the present exemplary embodiment is almost the same as the exemplary embodiment illustrated in FIGS. 1A to 6 described above, but when the upper mother substrate 2 is cut to a plurality of upper panels 200, the liquid crystal display may include an upper panel 200 in which the protrusion is removed so that two adjacent removed regions 21xa, 21xb, 21ya, and 21yb have a shape of "⏋" or a rotated form thereof in the cross region. In this case, the coated region of the alignment layer 21 does not exist between the removed regions 21xa, 21xb, 21ya, and 21yb of the alignment layer 21 and edges of the upper panels 200 adjacent thereto. The lower panel 100 may be cut so that the alignment layer 11 does not remain at the lower edge. In FIG. 26, the protrusions of the removed regions 11xc and 11yc do not exist between the removed regions 11xc and 11yc of the alignment layer 11 of the lower panel 100 and the removed regions 21xa and 21ya of the alignment layer 21 of the upper panel 200, but as illustrated in FIG. 1A described above, the protrusion of the removed regions 11xc and 11yc may also exist.

Next, referring to FIG. 28, the liquid crystal display according to the exemplary embodiment is almost the same as the exemplary embodiment illustrated in FIGS. 1A to 6 described above, but like the exemplary embodiment illustrated in FIG. 19 described above, the removed regions 11xa, 11xb, 11ya, and 11yb are formed, and the lower panel 100 formed according to the cutting method illustrated in FIG. 24 is included. Accordingly, two removed regions 11xc and 11yc cross each other in the cross region to have a shape of "+" or "+", or a rotated form thereof, and the coated region of the alignment layer 11 exists between the removed regions 11xc and 11yc of the alignment layer 11 and at least two edges of the lower panels 100 adjacent thereto.

In addition, the liquid crystal display according to the exemplary embodiment may include the lower panel 100 and the upper panel 200 formed by cutting the lower and upper mother substrates 1 and 2 by the exemplary embodiments illustrated in FIGS. 21 to 25 described above and other various methods.

Figure 29:
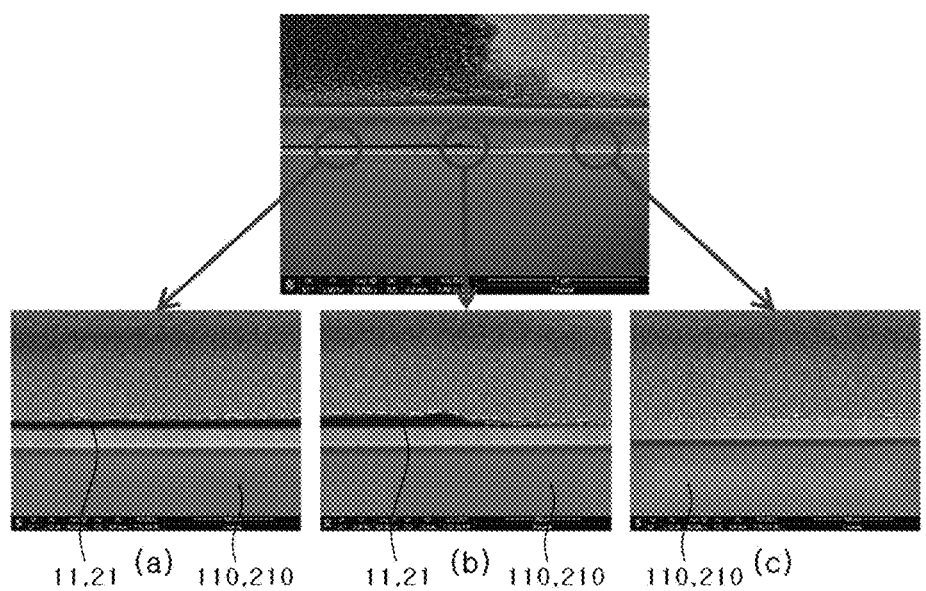
FIG. 29 is a cross-sectional view of an alignment layer selectively removed by using a laser in the manufacturing method of the liquid crystal display according to the exemplary embodiment.

FIG. 29 is a photograph illustrating a cross section in which the alignment layers 11 and 21 are removed by using a laser beam irradiating apparatus according to an exemplary embodiment.

Referring to FIG. 29, it may be verified that an interface of the alignment layers 11 and 21 patterned by using the laser beam irradiating apparatus is clearly formed, and the alignment layers 11 and 21 are fully removed at a portion where the alignment layers 11 and 21 are removed. Further, it is verified that a layer positioned below the alignment layers 11 and 21 is not damaged.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of symbols>

| | |
|---|---|
| 3: Liquid crystal layer | 11, 21: Alignment layer |
| 31: Liquid crystal molecule | 82, 87: Contact assistant |
| 100, 200, 300: Display panel | 110, 210: Substrate |
| 121: Gate line | 131: Common voltage transfer line |
| 140: Gate insulating layer | 154: Semiconductor |
| 171: Data line | 180, 180a, 180b, 180c: Passivation layer |
| 191: Pixel electrode | 220: Light blocking member |
| 230: Color filter | 270: Opposed electrode |
| 310: Sealant | 320: Short point |
| 325: Colored member | |

What is claimed is:

1. A display device, comprising:
   a lower panel including a first alignment layer and a signal line;
   an upper panel facing the lower panel and uncovering an end portion of the signal line of the lower panel; and
   a sealant positioned between the lower panel and the upper panel and coupling the lower panel and the upper panel with each other,
   wherein:
   the lower panel further includes a light blocking member,
   the sealant is positioned between the light blocking member and the upper panel, and overlaps the light blocking member,
   the sealant does not overlap the first alignment layer and is separated from the first alignment layer, and
   the first alignment layer includes a first portion and a second portion that are separated from each other in a first direction, and the sealant is disposed between the first portion and the second portion and separated from the first portion and the second portion in the first direction.

2. The display device of claim 1, wherein:
   the first alignment layer overlaps the light blocking member.

3. The display device of claim 1, wherein:
the upper panel includes a second alignment layer, and
the sealant does not overlap the second alignment layer and is separated from the second alignment layer.

4. The display device of claim 1, wherein:
in a plan view, the first alignment layer includes a coated region positioned between a first removed region and a second removed region, in which the first removed region overlaps the end portion of the signal line, and the second removed region overlaps the sealant, and
the first alignment layer does not exist in the first removed region and the second removed region.

5. The display device of claim 4, wherein:
the upper panel includes a second alignment layer,
the second alignment layer includes a third removed region overlapping the sealant, the second alignment layer not existing in the third removed region, and
the third removed region is spaced apart from the first removed region.

6. The display device of claim 5, wherein:
at least one of the first removed region, the second removed region, and the third removed region includes a first straight portion and a second straight portion which extend substantially perpendicular to each other and cross each other, and
the first straight portion and the second straight portion cross each other having any one shape of "+", "⊣", "⌐", or a rotated form thereof in a cross region of the first straight portion and the second straight portion.

7. The display device of claim 6, wherein:
the second alignment layer includes a coated region positioned between the third removed region and an edge of the upper panel adjacent to the third removed region.

8. The display device of claim 7, wherein:
another coated region of the first alignment layer is positioned between the first removed region and an edge of the lower panel adjacent to the first removed region.

9. The display device of claim 6, wherein:
the first removed region continuously extends in a straight form from a first edge of the lower panel to a second edge facing the first edge.

10. The display device of claim 9, wherein:
the third removed region continuously extends in a straight form from a third edge of the upper panel to a fourth edge facing the third edge.

11. The display device of claim 10, wherein:
the second removed region substantially perpendicularly crosses the first removed region.

12. The display device of claim 11, wherein:
the second removed region continuously extends in a straight form from the first edge of the lower panel to the second edge.

13. The display device of claim 6, wherein:
a width of at least one of the first straight portion and the second straight portion is uniform.

14. The display device of claim 13, wherein:
widths of at least two of the first removed region, the second removed region, and the third removed region are substantially the same as each other.

15. The display device of claim 6, wherein:
the coated region of the first alignment layer and a coated region of the second alignment layer do not overlap the sealant and are spaced apart from the sealant at a distance of 0 or more.

16. The display device of claim 6, further comprising:
a short point overlapping the sealant and electrically connecting the lower panel and the upper panel,
wherein the short point overlaps the second removed region and the third removed region.

17. The display device of claim 4, further comprising:
a plurality of signal lines, wherein:
the first removed region includes a plurality of removed portions respectively overlapping end portions of the plurality of signal lines and separated from each other, and
the coated region of the first alignment layer is further positioned between adjacent removed portions overlapping the end portions of the plurality of signal lines.

18. The display device of claim 17, wherein:
the upper panel includes a second alignment layer,
the second alignment layer includes a third removed region overlapping the sealant, the second alignment layer not existing in the third removed region, and
the third removed region is spaced apart from the first removed region.

19. The display device of claim 18, wherein:
at least one of the second removed region and the third removed region includes a first straight portion and a second straight portion which extend substantially perpendicular to each other and cross each other, and
the first straight portion and the second straight portion cross each other having any one shape of "+", "⊣", "⌐", or a rotated form thereof in a cross region of the first straight portion and the second straight portion.

20. The display device of claim 19, wherein:
the third removed region continuously extends in a straight form from a third edge of the upper panel to a fourth edge facing the third edge.

21. The display device of claim 20, wherein:
the second removed region continuously extends in a straight form from a first edge of the lower panel to a second edge facing the first edge.

* * * * *